(12) United States Patent
Chae

(10) Patent No.: US 9,547,634 B2
(45) Date of Patent: Jan. 17, 2017

(54) TERMINAL AND METHOD FOR EDITING TEXT USING THE SAME

(71) Applicant: SAMSUNG DISPLAY CO., LTD., Yongin, Gyeonggi-Do (KR)

(72) Inventor: Kyung Chan Chae, Yongin-Si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 163 days.

(21) Appl. No.: 14/030,635

(22) Filed: Sep. 18, 2013

(65) Prior Publication Data

US 2014/0344678 A1 Nov. 20, 2014

(30) Foreign Application Priority Data

May 14, 2013 (KR) .......................... 10-2013-0054471

(51) Int. Cl.
G06F 17/24 (2006.01)
G06F 3/023 (2006.01)
G06F 3/0488 (2013.01)

(52) U.S. Cl.
CPC ............. G06F 17/24 (2013.01); G06F 3/0236 (2013.01); G06F 3/04886 (2013.01)

(58) Field of Classification Search
CPC .... G06F 17/24; G06F 3/0236; G06F 3/04883; G06F 17/28; H04M 1/72552
USPC ....................................................... 715/256
See application file for complete search history.

(56) References Cited

U.S. PATENT DOCUMENTS

| | | | |
|---|---|---|---|
| 6,229,919 B1 * | 5/2001 | Hirayama | G06F 3/04883 382/187 |
| 8,656,296 B1 * | 2/2014 | Ouyang et al. | 715/770 |
| 2007/0109281 A1 * | 5/2007 | Simmons et al. | 345/179 |
| 2007/0260981 A1 * | 11/2007 | Kim et al. | 715/531 |
| 2009/0161958 A1 * | 6/2009 | Markiewicz et al. | 382/186 |
| 2011/0035209 A1 * | 2/2011 | Macfarlane | 704/9 |
| 2013/0019169 A1 | 1/2013 | Bastide et al. | |
| 2014/0040733 A1 * | 2/2014 | Colley | 715/256 |

FOREIGN PATENT DOCUMENTS

| | | |
|---|---|---|
| KR | 10-2007-0107462 | 11/2007 |
| KR | 10-2009-0042740 | 4/2009 |
| KR | 10-2012-0019637 | 7/2012 |
| KR | 10-2012-0020659 | 8/2012 |

OTHER PUBLICATIONS

European Office Action dated Jan. 26, 2015 in corresponding European Patent Appln. No. 14153136.8.
English Abstract for Publication No. 10-2012-0020659.
English Abstract for Publication No. 10-2009-0042740.
English Abstract for Publication No. 10-2012-0019637.
English Abstract for Publication No. 10-2007-0107462.

\* cited by examiner

*Primary Examiner* — Kumar Patel
*Assistant Examiner* — Amy C Onyekaba
(74) *Attorney, Agent, or Firm* — F. Chau & Associates, LLC

(57) ABSTRACT

A terminal includes a display unit and a controller. The display unit includes a touch sensor. The touch sensor senses a touch input. The display unit displays text. The controller divides a first part of the text, enlarges the first part, and displays the enlarged first part on the display unit in response to a first touch input that occurs on the displayed text and that is sensed through the touch sensor. The first part of the text corresponds to the first touch input.

12 Claims, 30 Drawing Sheets

TERMINAL AND METHOD FOR EDITING TEXT USING THE SAME

CROSS-REFERENCE TO RELATED APPLICATIONS

This U.S. non-provisional application claims priority to Korean Patent Application No. 10-2013-0054471, filed on May 14, 2013 in the Korean Intellectual Property Office, the disclosure of which is incorporated by reference herein in its entirety.

TECHNICAL FIELD

Exemplary embodiments of the present invention relate to a terminal and a method for editing text using the same.

DISCUSSION OF THE RELATED ART

A device such as a smart phone may have touch screen functionality that allows for entry of text through a virtual keyboard. For better portability, the screen size of the device is reduced, but this may cause more errors in typing.

SUMMARY

An exemplary embodiment of the present invention provides a method for editing text using a terminal. In the method, a first touch input is sensed. The first touch input occurs on the text. The text is displayed on a text display area of the terminal. A first part of the text corresponds to the first touch input. In response to the touch input, the first part of the text is enlarged and displayed on the display unit.

In an exemplary embodiment of the present invention, a terminal includes a display unit and a controller. The display unit displays text. The display unit includes a touch panel. The controller divides a first part of the text into sub-parts. The first part of the text corresponds to a first touch input. The first part is enlarged and displayed on the display unit in response to the first touch input. The first touch input occurs on the text. The text is displayed on the display unit and is sensed through the touch panel.

According to an exemplary embodiment of the present invention, in a method of editing a text message, a first touch is performed on a first part of the text message. The first part includes one or more characters. The characters are enlarged. A second touch is performed on one of the characters. The second-touched character is replaced by another character.

BRIEF DESCRIPTION OF THE DRAWINGS

The features of the present invention will be more apparent from the following detailed description taken in conjunction with the accompanying drawings, in which.

DETAILED DESCRIPTION OF EMBODIMENTS

Figure 1:
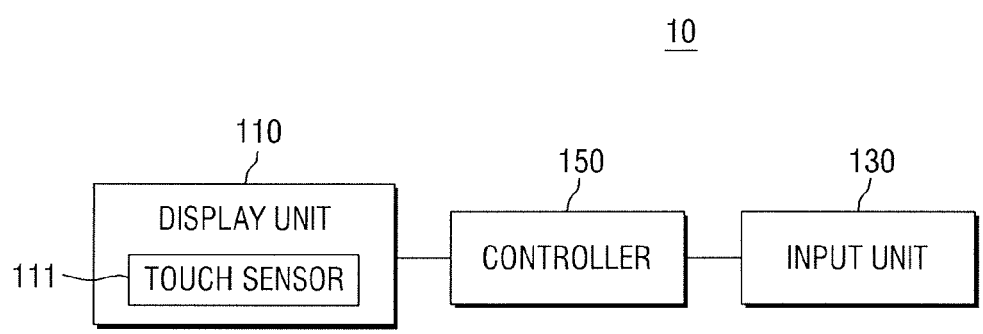
FIG. 1 is a block diagram illustrating a configuration of a terminal according to an exemplary embodiment of the present invention.

Hereinafter, exemplary embodiments of the present invention will be described in detail with reference to the accompanying drawings. The present invention will be apparent by referring to exemplary embodiments thereof with reference to the accompanying drawings. The same reference numerals may be used to denote the same or substantially the same elements throughout the specification and the drawings.

As used herein, a terminal may include a mobile terminal, such as a portable phone, a smart phone, a notebook computer, a terminal for digital broadcasting, a PDA (Personal Digital Assistant), a PMP (Portable Multimedia Player), or navigation, and a stationary terminal, such as a digital TV or a desktop computer, and may be implemented in diverse forms. In the following description, for the purpose of description, the terminal is a mobile terminal. However, unless the context clearly indicates otherwise, exemplary embodiments of the present invention may also be applied to a stationary terminal.

As used herein, the singular forms "a," "an," and "the" are intended to include the plural forms as well, unless the context clearly indicates otherwise.

FIG. 1 is a block diagram illustrating a configuration of a terminal according to an exemplary embodiment of the present invention.

Referring to FIG. 1, a terminal 10 may include a display unit 110 and a controller 150. The terminal 10 may further include an input unit 130.

The display unit 110 displays information that is processed in the terminal 10. For example, when the terminal 10 is in a phone call mode, the display unit 110 may display a UI (User Interface) or a GUI (Graphic User Interface) related to the phone call. When a user prepares text, the display unit 110 may display the text prepared by the user.

The display unit 110 may include various display devices. For example, the display unit 110 may include a liquid crystal display, a thin film transistor-liquid crystal display, an organic light emitting diode display, a flexible display, and/or a 3D (three-dimensional) display. Some transparent display devices may be used allowing an outside to be seen therethrough. The transparent displays may include, e.g., a TOLED (Transparent Organic Light Emitting Diode) display. Further, depending on the implementation type of the terminal 10, two or more display units 110 may be provided.

The display unit 110 may include a touch sensor 111. A display device and the touch sensor 111 may form a mutual layer structure. The display unit 110 may include a touch screen. The display unit 110 may function as an output device and/or an input device. The touch sensor 111 may convert pressure that is applied to a specific region of the display unit 110 or a change in capacitance that occurs on the specific region of the display unit 110 into an electrical input signal. The touch sensor 111 may detect the position, area, and pressure of a touch. When the touch sensor 111 has a touch input, a corresponding signal may be sent to a touch controller. The touch controller may process the signal into corresponding data and may transmit the corresponding data to the controller 150. Accordingly, the controller 150 can recognize the area where the touch has occurred in the display unit 110.

For example, the touch input may include a real touch and a proximity touch by hovering. The touch input may also include a single touch and a multi-touch (a double touch, touch and drag, and a long touch).

The input unit 130 may generate input data for a user to control the operation of the terminal 10. The input unit 130 may include a keypad, a dome switch, a touch pad, a touch panel, a jog wheel, and/or a jog switch. For the purpose of description, the input unit 130 is a keypad that is displayed on a keypad display area of the display unit 110. For example, the input unit 130 may be implemented by the touch sensor 111 of the display unit 110. However, exemplary embodiments of the present invention are not limited thereto.

The controller 150 controls the whole operation of the terminal 10. For example, when the terminal 10 is a mobile communication terminal, the controller 150 performs control and processing related to voice communication, data communication, and a video call. For example, the controller 150 may divide the text selected by user's touch input into syllables, numerals, symbols, or letters depending on the type of the text.

Figure 2:
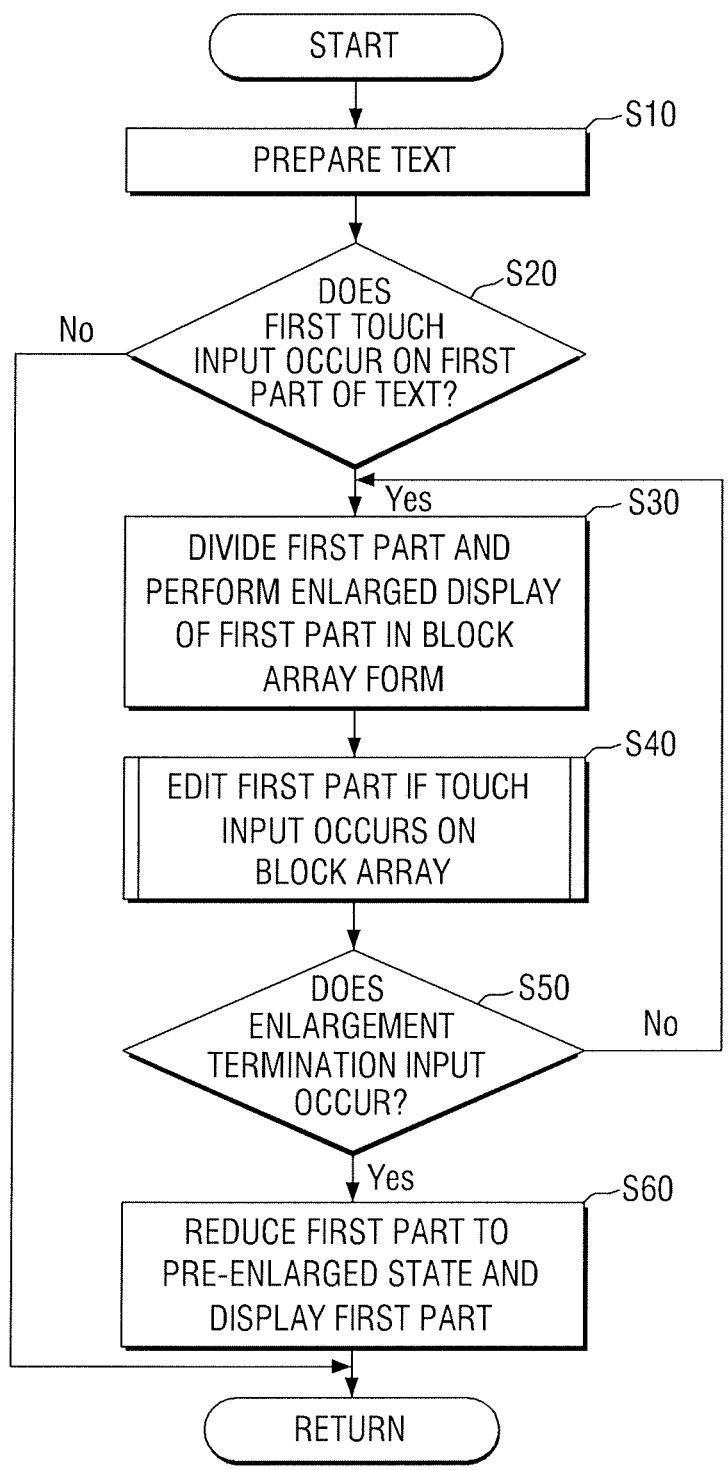
FIG. 2 is a flowchart illustrating a method for editing text using a terminal according to an exemplary embodiment of the present invention.

FIG. 2 is a flowchart illustrating a method for editing text using a terminal according to an exemplary embodiment of the present invention.

In a method for editing text using a terminal, text is prepared in a text preparation mode of the terminal (S10). A first touch input occurring on the prepared text is sensed (S20). A first part of the text corresponding to the first touch input is divided, and the first part is enlarged in the form of a block array (S30). The enlarged first part may be edited when a touch input occurs on the block array (S40). When an enlargement termination input occurs (S50), the enlarged first part returns to its pre-enlarged state, and the first part of the pre-enlarged state is displayed (S60). After displaying the first part of the pre-enlarged state, the terminal returns to the text preparation mode in the text preparation mode unless an event occurs, such as an occurrence of a separate input to terminate the text preparation mode.

When the touch input occurs on the block array, editing the enlarged first part (S40) may be performed in various ways.

Figure 3:
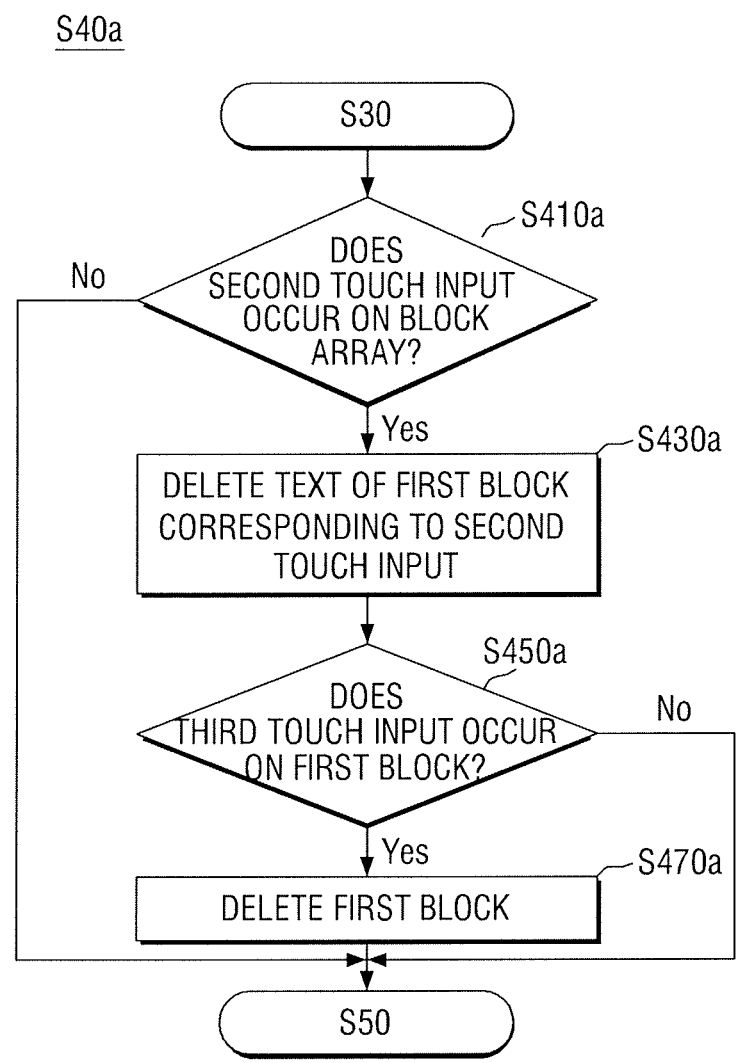
FIG. 3 is a flowchart illustrating a method for editing a first part in a method for editing text according to an exemplary embodiment of the present invention.

FIG. 3 is a flowchart illustrating a method for editing a first part in a method for editing text according to an exemplary embodiment of the present invention.

Referring to FIG. 3, in editing an enlarged first part of the text (S40a), whether a second touch input occurs on the block array (S410a) may be sensed, and when the second touch input occurs on the block array (S410a), the text of a block that corresponds to the second touch input and that is included in a block array may be deleted (S430a). In editing the enlarged first part (S40a), whether a third touch input occurs on the block from which the text is deleted may be sensed (S450), and when the third touch input occurs, the block on which the third touch input occurs may be deleted (S470).

FIGS. 4 to 16 are views illustrating processes of editing text using a terminal according to exemplary embodiments of the present invention. For example, FIGS. 4 to 10 illustrate a process of editing English text, and FIGS. 11 to 16 illustrate a process of editing Korean text.

Referring to FIGS. 1 to 10, a process of editing English text is described.

Figure 4:
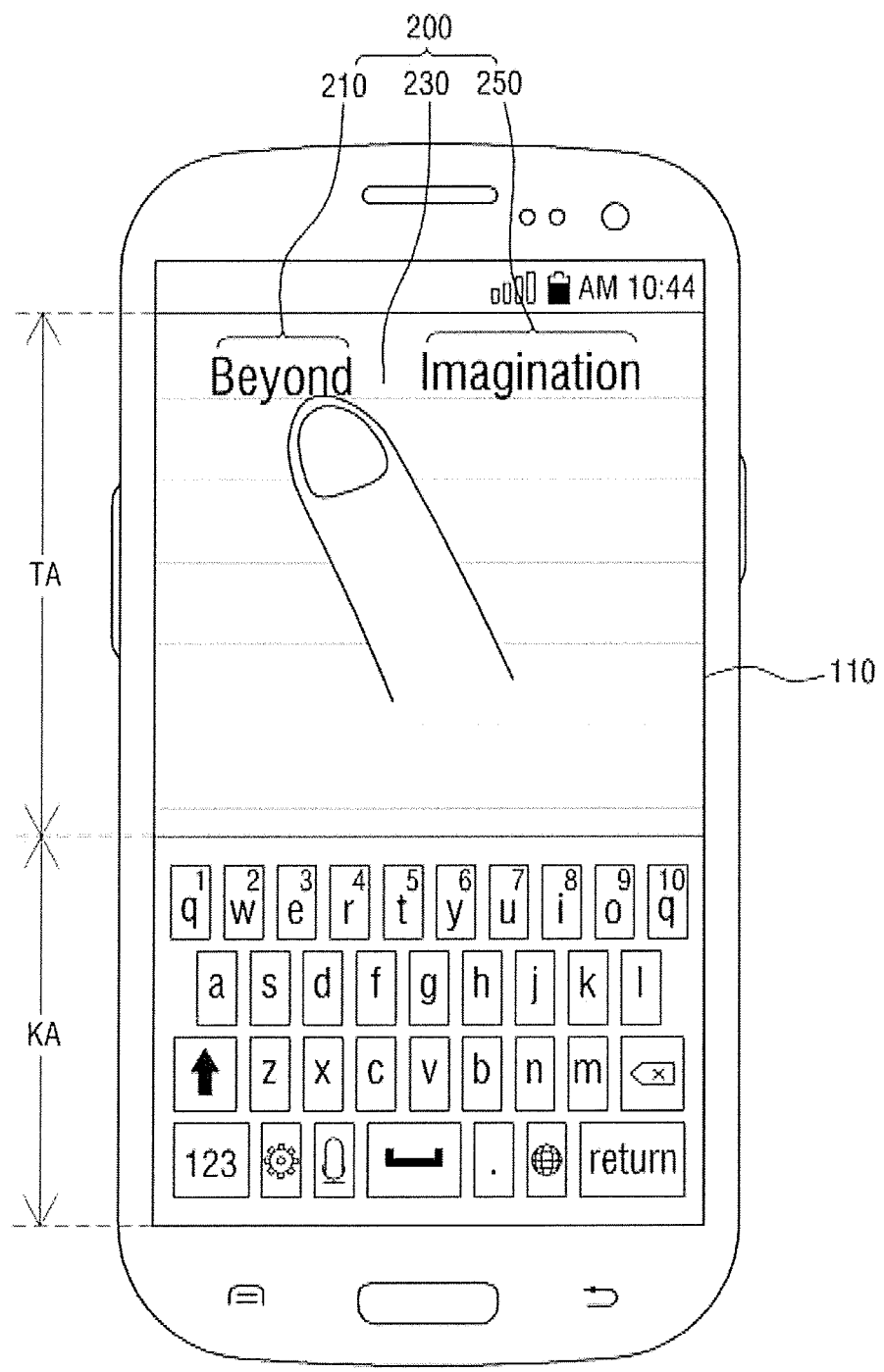
FIGS. 4 to 16 are views illustrating processes of editing text using a terminal according to exemplary embodiments of the present invention.

As illustrated in FIG. 4, when a user operates a keypad that is displayed on a keypad display area KA of the display unit 110 in a text preparation mode of the terminal, the controller 150 may display text 200 on the text display area TA of the display unit 110 in response to the user's keypad operation.

Figure 5:
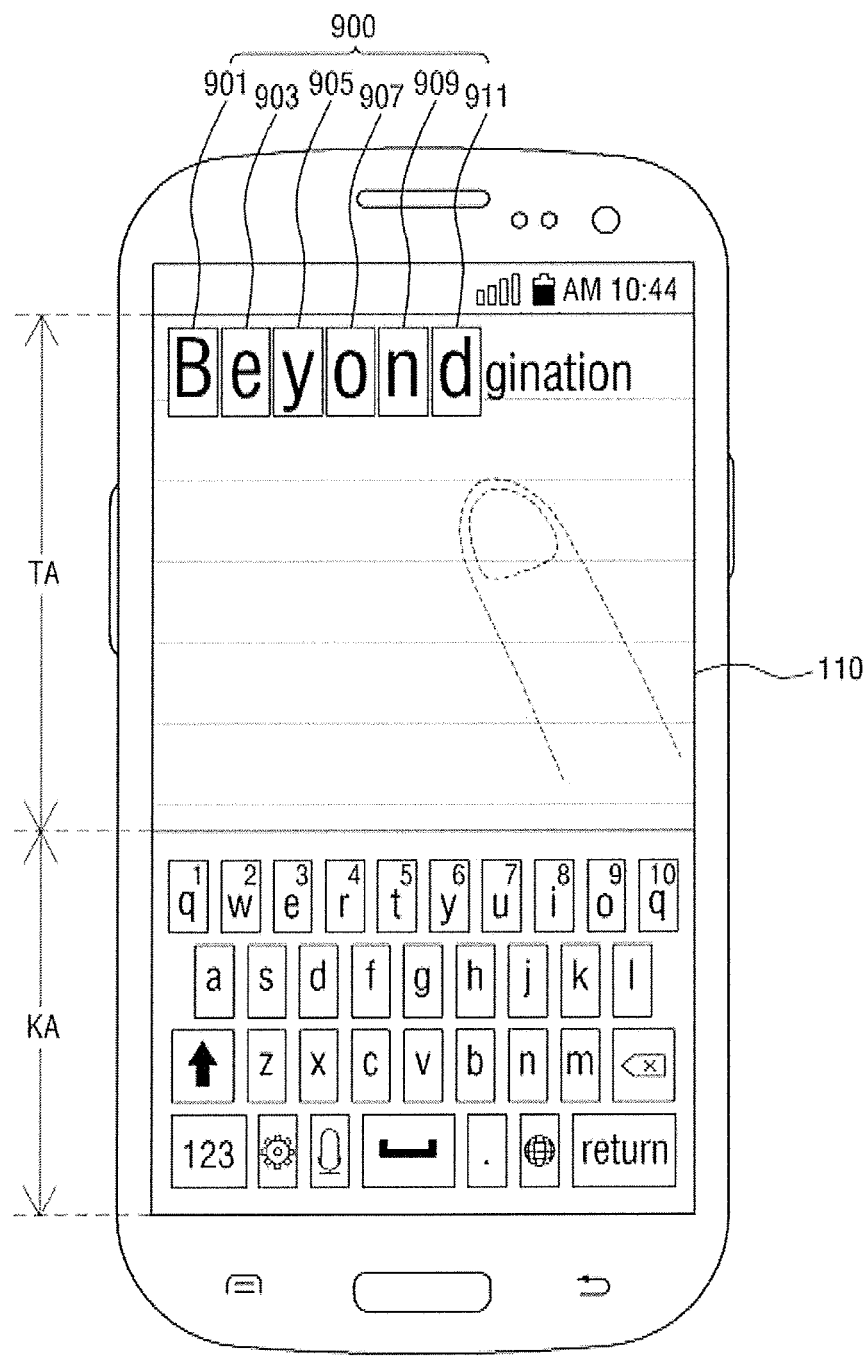

When the touch sensor 111 senses the user's touch input (hereinafter referred to as a "first touch input") that occurs on the text 200 displayed on the display unit 110 during the preparation of the text 200, the controller 150 may divide a first part of the text 200 corresponding to the first touch input into a plurality of pieces and may enlarge the first part in response to the first touch input as illustrated in FIG. 5. The first part of the text 200 may be a word that corresponds to where the first touch input occurs. The first part of the text 200 may be divided into syllables, numerals, symbols, and letters in an alphabet depending on the type of the text 200.

For example, when the text 200 is a phrase "Beyond Imagination" that includes one English word "Beyond" 210, a spacing 230, and one English word "Imagination" 250, the word "Beyond" 210 corresponds to the user's first touch input as illustrated in FIG. 4, and thus, "Beyond" 210 may correspond to the first part 210.

As illustrated in FIG. 5, the controller 150 may divide the word "Beyond" that corresponds to the first part 210 of the text 200 into alphabetical letters "B", "e", "y", "o", "n", and "d", may allocate the respective letters to a plurality of blocks 901, 903, 905, 907, 909, and 911, and may display the enlarged first part on the display unit 110 in the form of a block array 900. According to an exemplary embodiment of the present invention, when the word that corresponds to the first part 210 includes additional numerals or symbols, the additional numerals or symbols may be divided in substantially the same manner as the letters, and the divided numerals or symbols may be allocated to their respective blocks.

As illustrated in FIG. 5, the divided pieces of the first part 210 (e.g., respective letters, numerals, or symbols) may be displayed in the blocks 901, 903, 905, 907, 909, and 911, respectively, of the block array 900, and the number of the blocks 901, 903, 905, 907, 909, and 911 may be substantially equal to the number of the divided pieces of the first part 210.

The shape of the blocks 901, 903, 905, 907, 909, and 911 are not limited as shown in the drawings. As shown in FIG. 5, the blocks 901, 903, 905, 907, 909, and 911 have a rectangular shape. However, the blocks 901, 903, 905, 907, 909, and 911 may have other shapes, such as a circle, an ellipse, or a polygon. As shown in FIG. 5, the blocks 901, 903, 905, 907, 909, and 911 are spaced apart from each other. However, exemplary embodiments of the present invention are not limited thereto. For example, the blocks 901, 903, 905, 907, 909, and 911 may contact each other.

When an enlargement termination input is caused by the user after the first part 210 is enlarged and displayed, the controller 150 may return the first part 210 to its pre-enlarged state, displaying the reduced first part 210. For example, as shown in FIG. 5, when a user's touch input (hereinafter referred to as a "fourth touch input") occurs on the remaining part of the display unit 110 except for the part on which the block array 900 is displayed, the controller 110 may recognize the fourth touch input as the enlargement termination input and may return the first part 210 to its pre-enlarged state as illustrated in FIG. 4, displaying the reduced first part 210 on the display unit 110. The terminal 10 may return to the text preparation mode for receiving text from the user.

Figure 6:
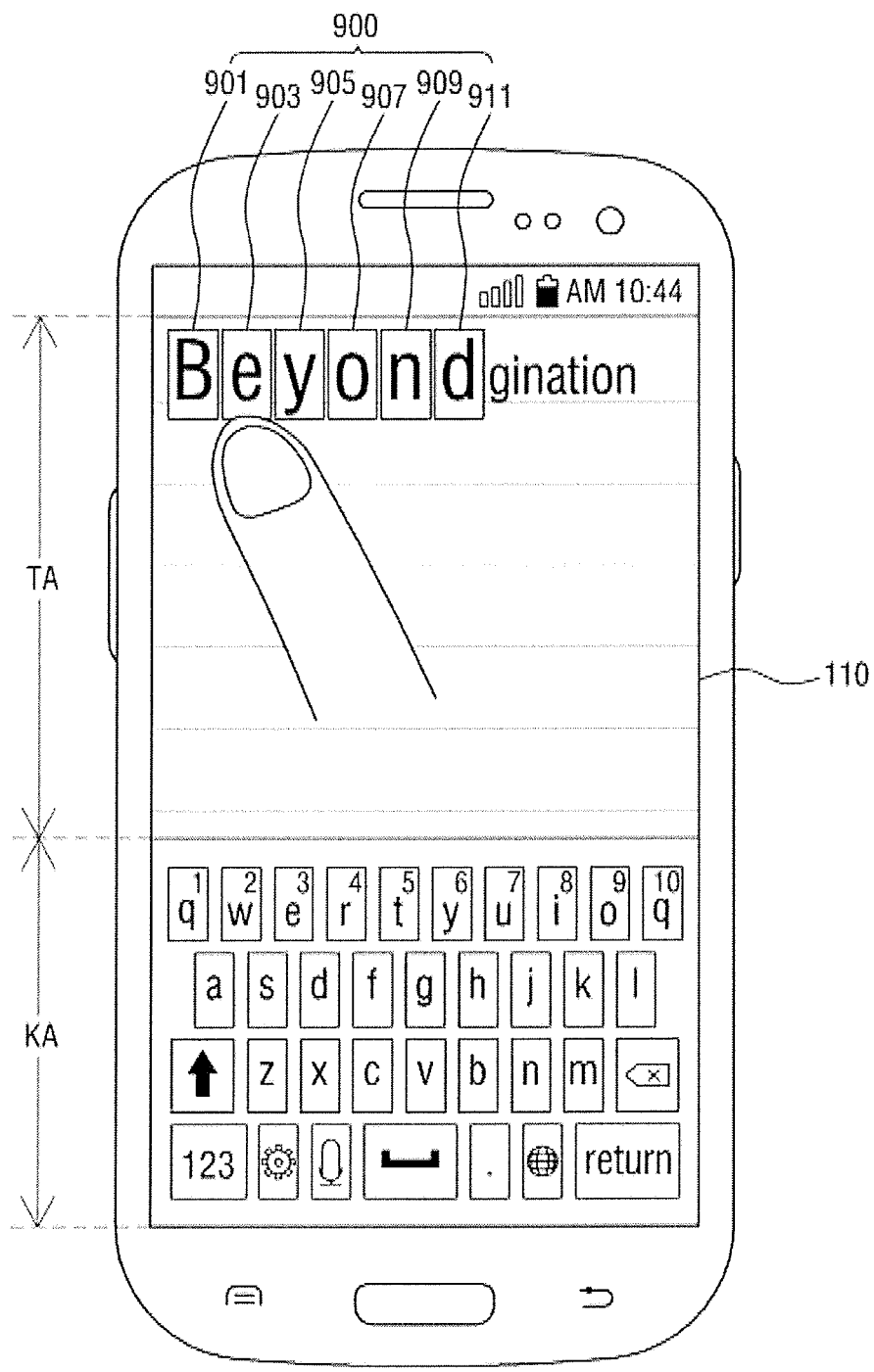
Figure 7:
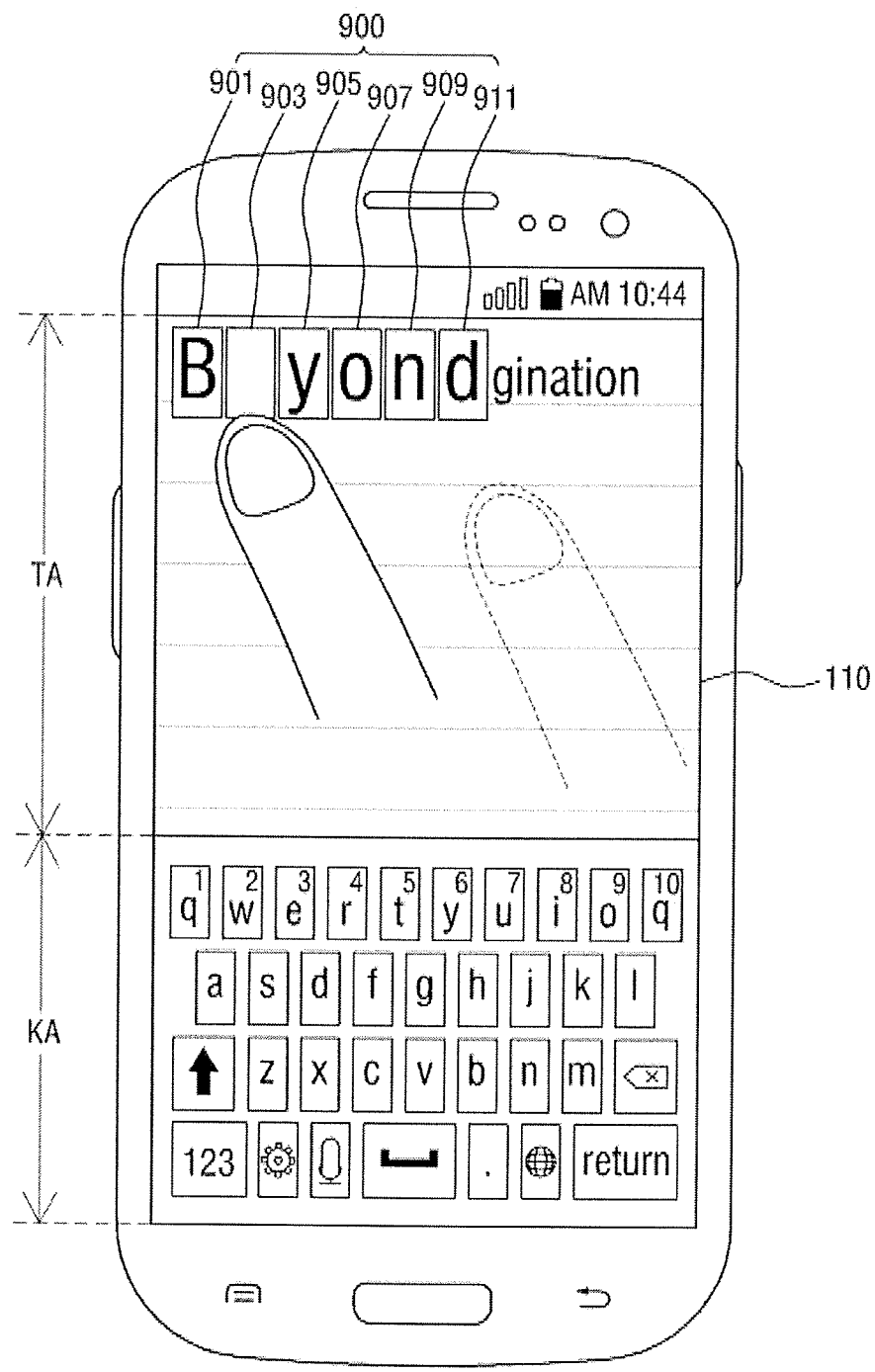

As illustrated in FIG. 6, when a user's touch input (hereinafter referred to as a "second touch input") for selecting one 903 (hereinafter, referred to as a "first block") of the plurality of blocks 901, 903, 905, 907, 909, and 911 that is included in the block array 900 occurs, the controller 150 may delete part (e.g., "e") of the text that is displayed on the first block 903 corresponding to the second touch input as illustrated in FIG. 7. When a separate text input is caused by the user, the controller 150 may display text that corresponds to the user's separate text input on the first block 903. Hereinafter, the first block refers to a block of the block array 900 on which the user's touch input occurs. The first block may be changed depending on the position where the touch input occurs. For example, the term "first block" may be used to discriminate the block on which the user's touch input occurs from other blocks.

Figure 8:
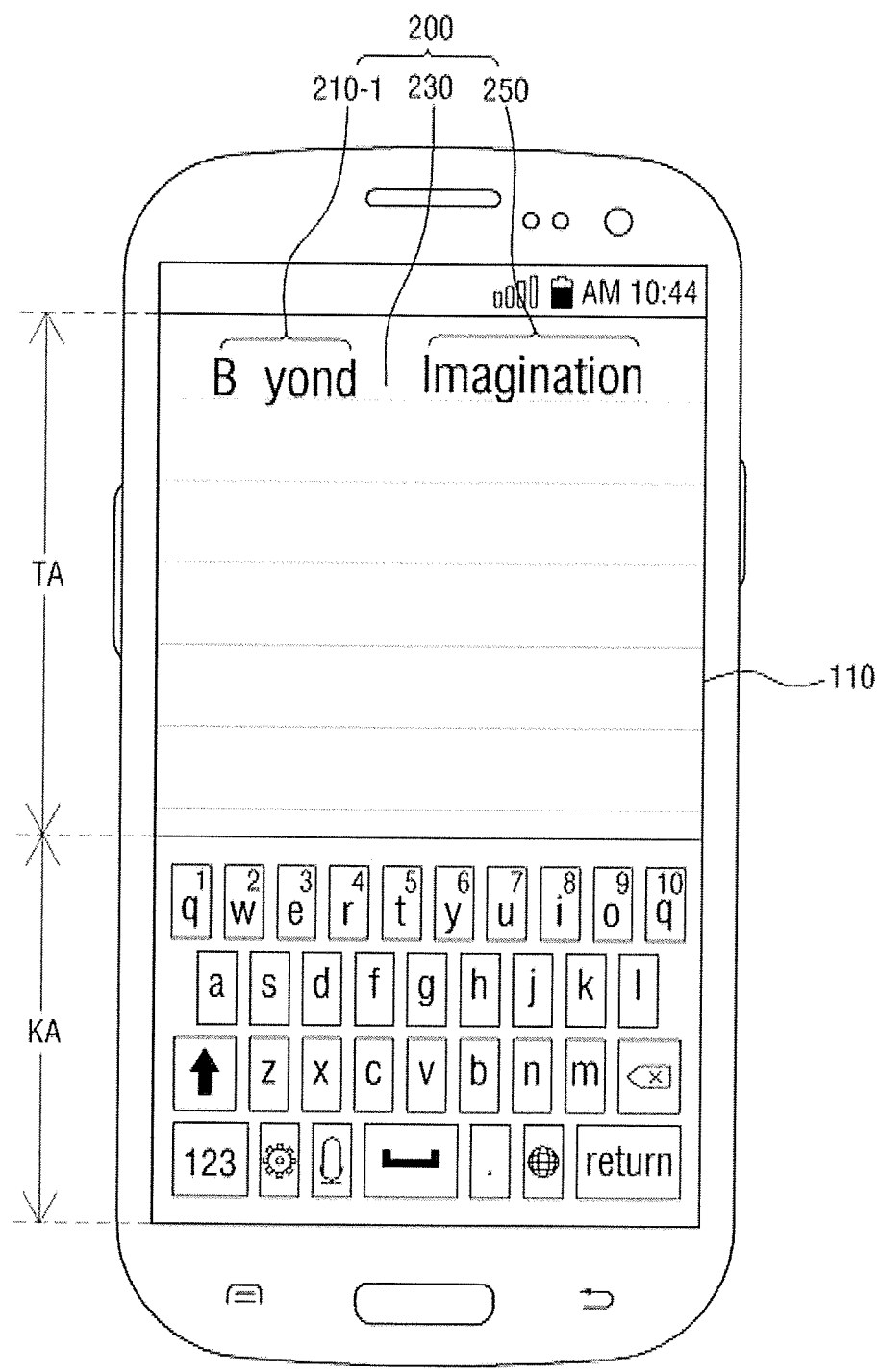

When the fourth touch input occurs on the remaining part of the display unit 110 except for the part on which the block array 900 is displayed while no user's text input occurs, the controller 150 may return the edited first part 210-1 to its pre-enlarged state and may display the reduced first part 210-1 on the display unit 110 as illustrated in FIG. 8. The edited first part 210-1 may include a blank where "e" used to be displayed.

Figure 9:
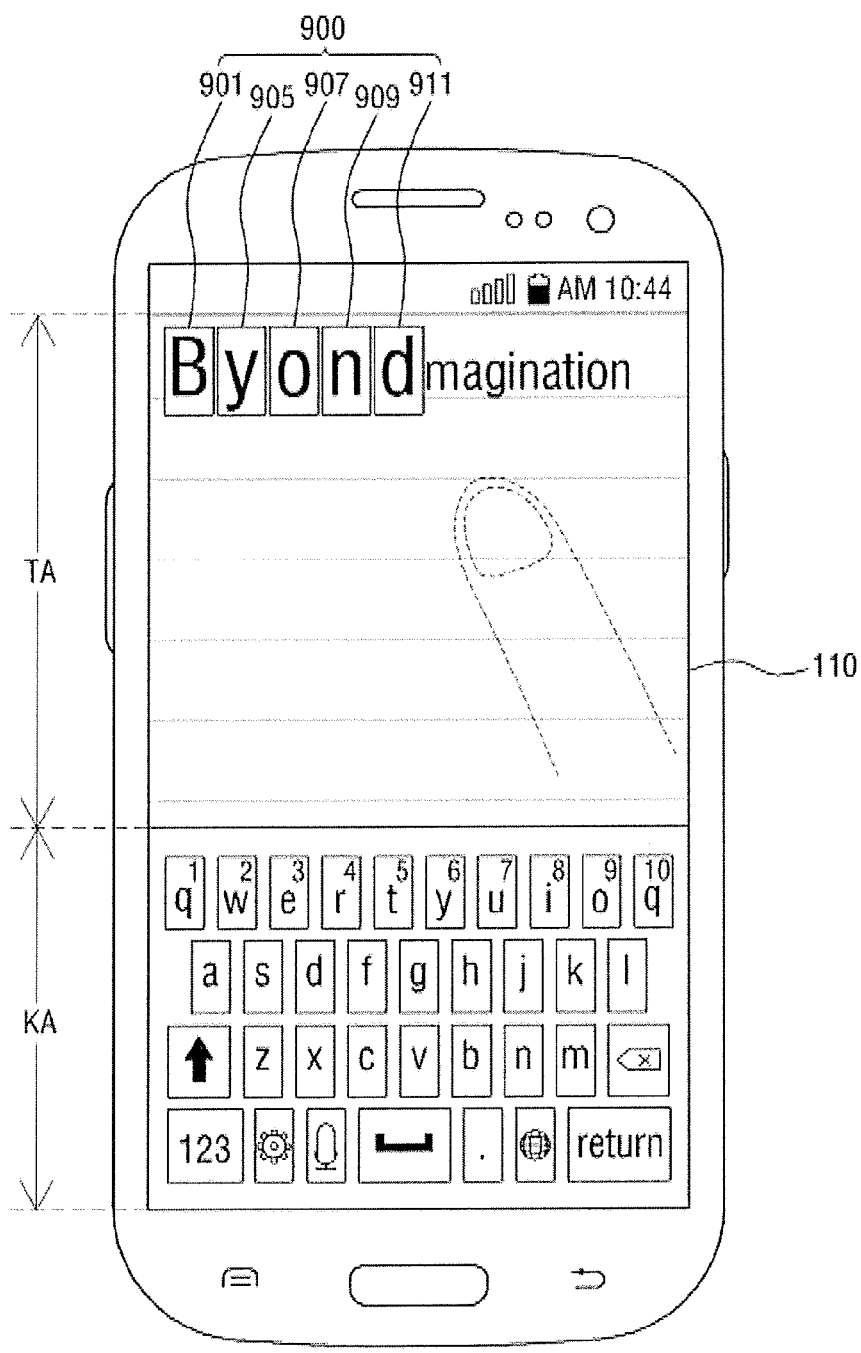
Figure 10:
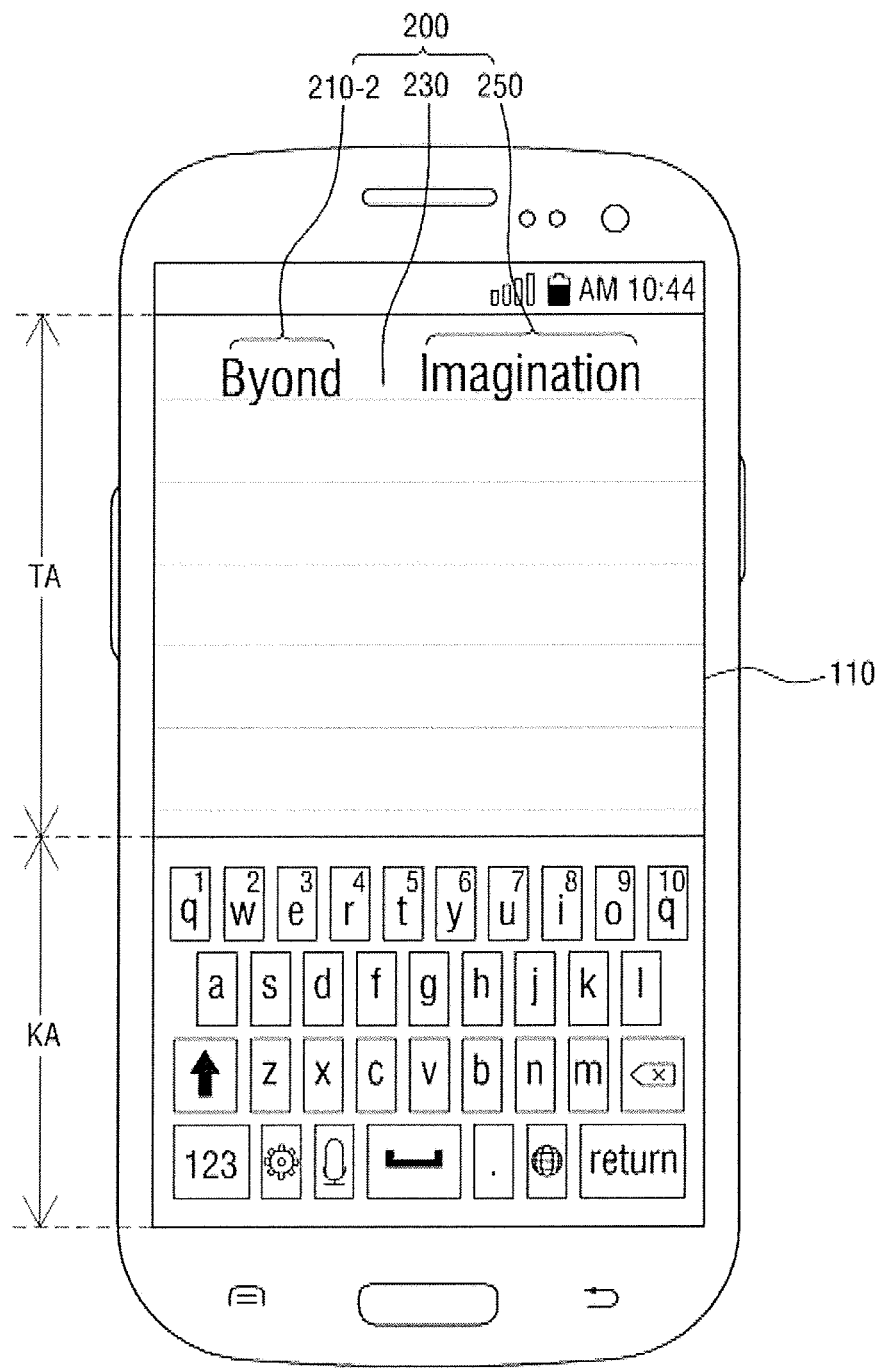

When a user's touch input (hereinafter referred to as a "third touch input") occurs on the first block from which the text is deleted as illustrated in FIG. 7 while the user's text input and the fourth touch input do not occur, the controller 150 may delete the first block (903 in FIG. 6) that is positioned between the two blocks 901 and 905 as illustrated in FIG. 9. When the fourth touch input occurs while the first block (903 in FIG. 6) is deleted, the controller 150 may return the edited first part 210-2 to its pre-enlarged state and may display the reduced first part on the display unit 110 as illustrated in FIG. 10. The edited first part 210-2 does not include the blank where "e" used to be displayed, unlike that illustrated in FIG. 8.

An example in which the text is English text has been described by way of example. However, exemplary embodiments of the present invention are not limited thereto. For example, exemplary embodiments of the present invention may be also applied to any Roman alphabet-based, non-English text.

Referring to FIGS. 1 to 3, and 11 to 16, a process of editing a Korean text is described.

Figure 11:
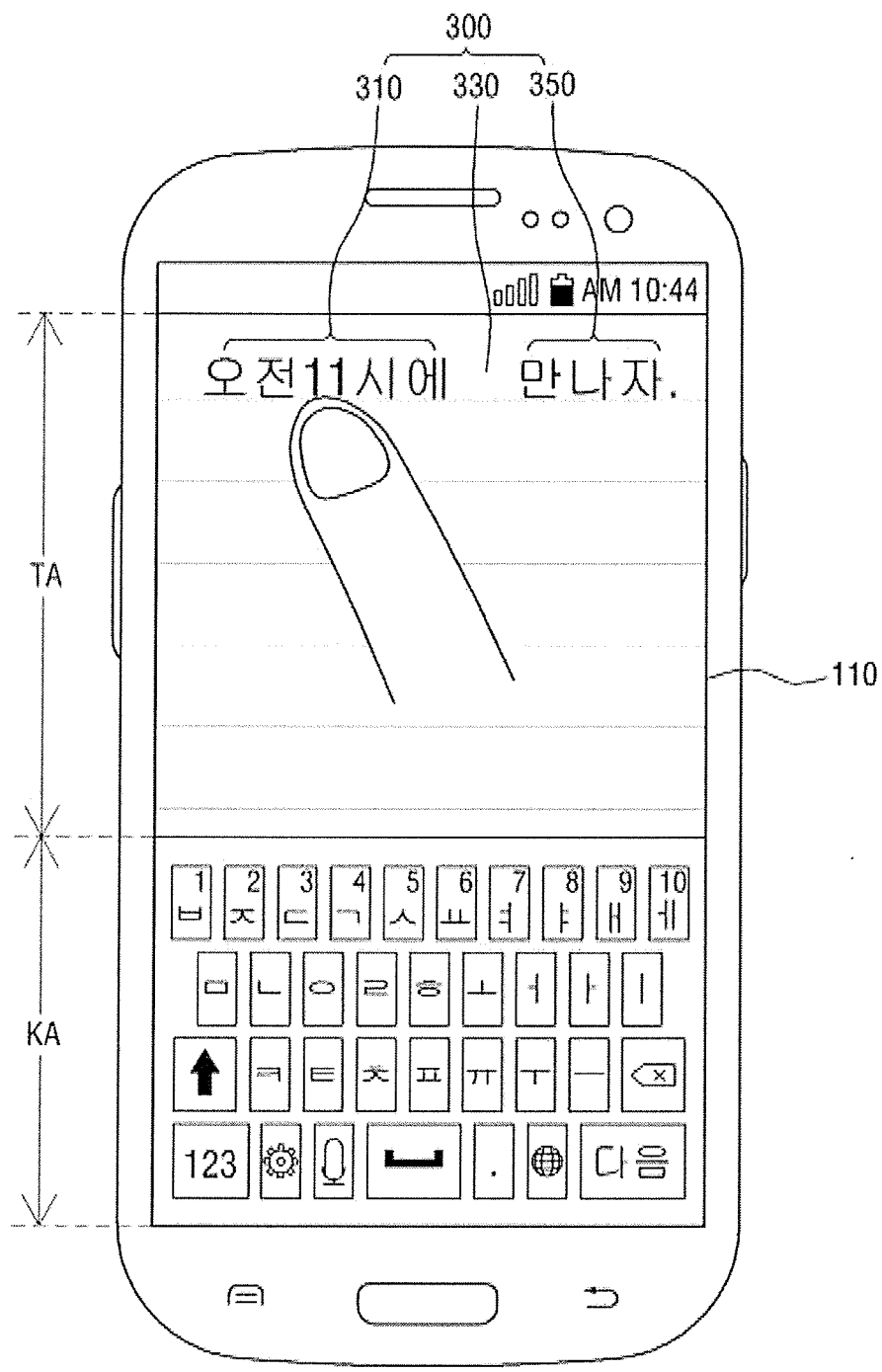

As illustrated in FIG. 11, when a user operates a keypad that is displayed on a keypad display area KA of the display unit 110, the controller 150 may display text 300 on the text display area TA of the display unit 110 in response to the user's keypad operation.

Figure 12:
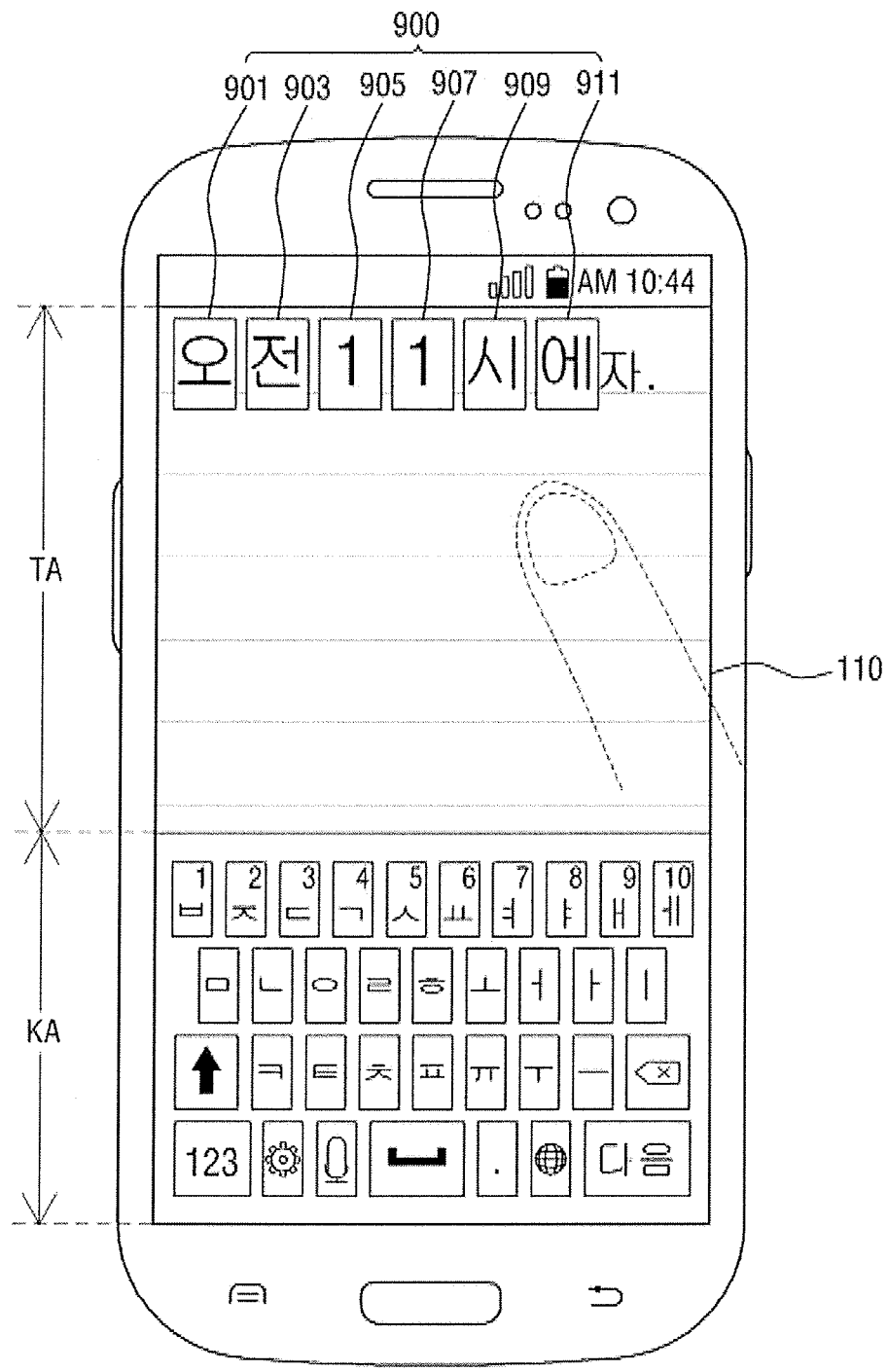

When the touch sensor 111 senses a user's touch input (e.g., a first touch input) that occurs on the text 300 displayed on the display unit 110, the controller 150 may divide a first part of the text 300 corresponding to the first touch input into a plurality of pieces and may enlarge the first part in response to the first touch input as illustrated in FIG. 12. The first part of the text 300 may be a word or eojeol that corresponds to where the first touch input occurs. As used herein, "eojeol" refers to each part of a sentence which is separated by spaces from its preceding and succeeding ones. The first part of the text 300 may be divided into syllables, numerals, symbols, and letters depending on the type of the text 300.

For example, when the text 300 is a Korean sentence "오전11시에 만나자", the text 300 may include an eojeol 310 "오전11시에", a space 330, and another eojeol 350 "만나자" The eojeol that corresponds to the user's first touch input as illustrated in FIG. 11 is "오전11시에" 310 that may correspond to the first part 210.

As illustrated in FIG. 12, the controller 150 may divide the eojeol "오전11시에" that corresponds to the first part 310 of the text 300 into respective syllables and numerals "오", "전", "1", "1", "시", and "에", and the controller 150 may allocate the respective syllables and numerals to the plurality of blocks 901, 903, 905, 907, 909, and 911, respectively. The controller 150 may enlarge the first part on the display unit 110 in the form of a block array 900.

The respective syllables and numerals included in the first part 310 may be displayed in the respective blocks 901, 903, 905, 907, 909, and 911 of the block array 900. The number of the blocks 901, 903, 905, 907, 909, and 911 may be substantially equal to the number of the syllables and numerals included in the first part 310.

For example, substantially the same shape and arrangement as described above in connection with FIG. 5 may apply to the blocks 901, 903, 905, 907, 909, and 911.

When an enlargement termination input (e.g., the fourth touch input) is caused by the user after the first part 310 is enlarged and displayed, the controller 150 may display the first part 310 of its pre-enlarged state. For example, as shown in FIG. 12, when the fourth touch input occurs on the remaining part of the display unit 110 except for the part on which the block array 900 is displayed, the controller 110 may recognize the fourth touch input as the enlargement termination input and may return the first part 310 to its pre-enlarged state as illustrated in FIG. 11, displaying the reduced first part 310 on the display unit 110.

Figure 13:
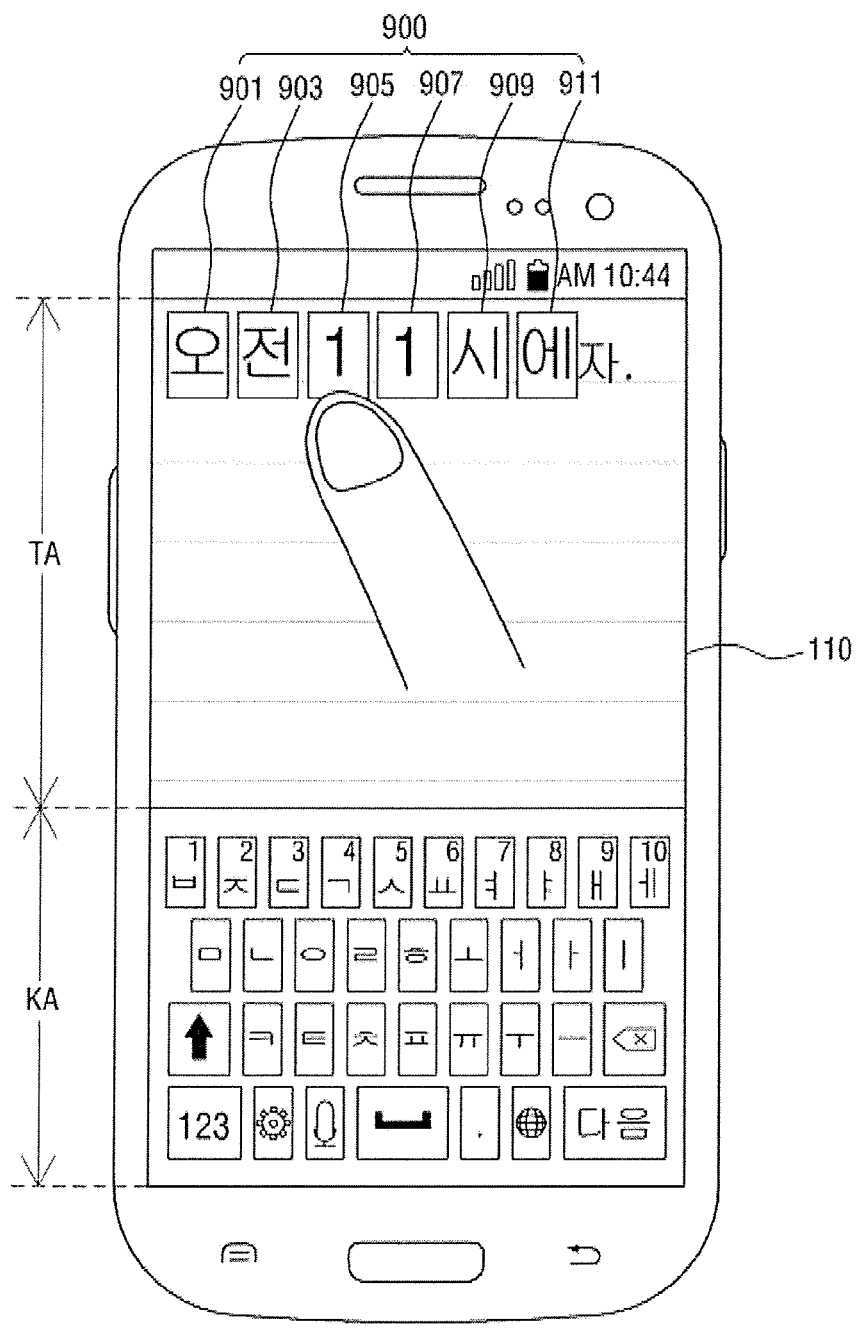
Figure 14:
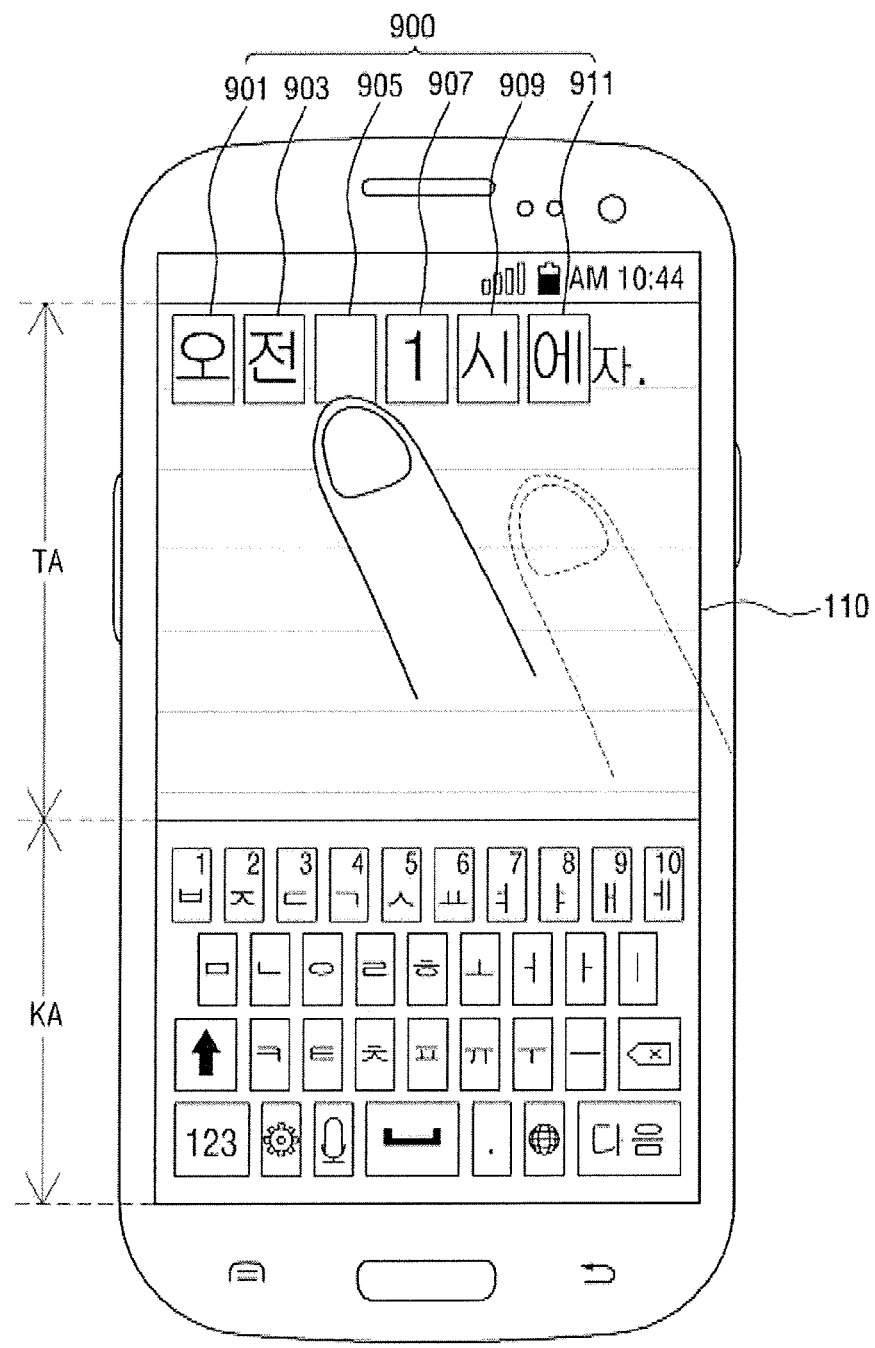

As illustrated in FIG. 13, when a user's touch input (e.g., a "second touch input") for selecting one 905 (hereinafter, referred to as a "first block") of the plurality of blocks 901, 903, 905, 907, 909, and 911 of the block array 900 occurs, the controller 150 may delete the text (e.g., "1") that is displayed on the first block 905 corresponding to the second touch input as illustrated in FIG. 14. When a separate text input is caused by the user, the controller 150 may display text that corresponds to the user's text input on the first block 905.

When the enlargement termination input (e.g., fourth touch input) occurs while the second touch input occurs, the controller 150 may return the edited first part to its pre-enlarged state and may display the reduced first part on the display unit 110. The edited first part may be "오전 1시에", and a blank is positioned between "오전" and "1시에."

Figure 15:
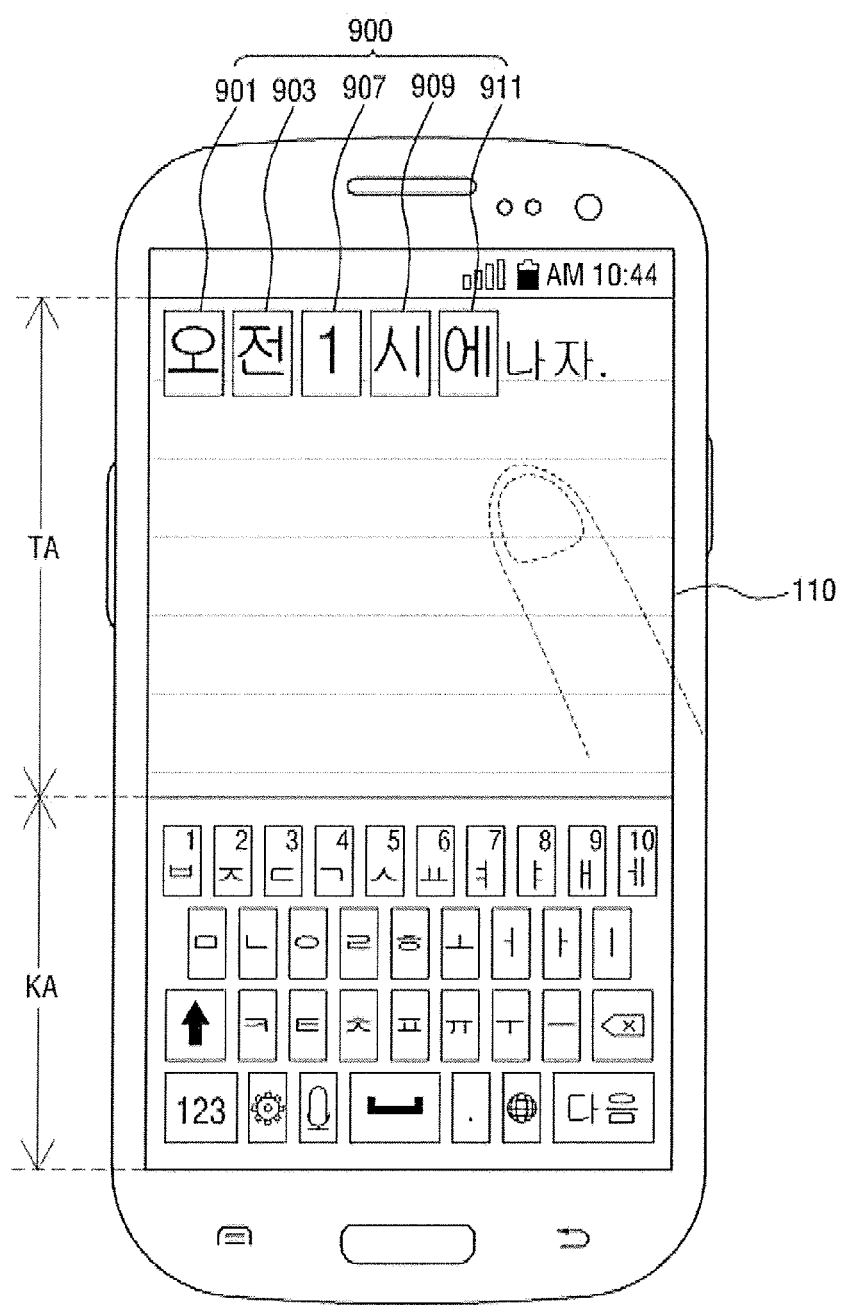
Figure 16:
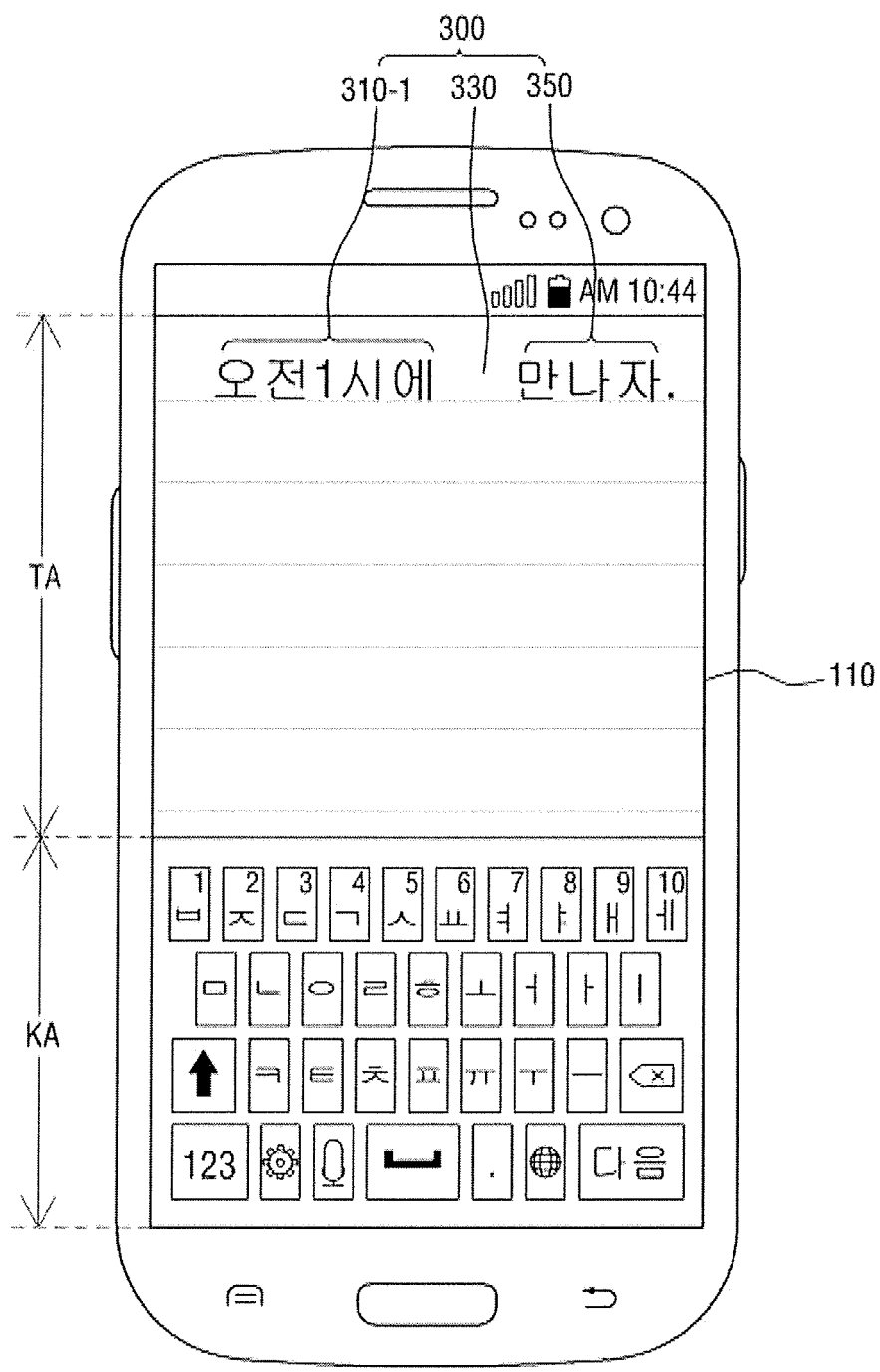

When a user's touch input (e.g., a "third touch input") occurs on the first block 905 from which the text is deleted as illustrated in FIG. 14 while the user's text input and the fourth touch input do not occur, the controller 150 may delete the first block (905 in FIG. 14) that is positioned between the two blocks 903 and 907 as illustrated in FIG. 15. When the fourth touch input occurs while the first block (905 in FIG. 14) is deleted, the controller 150 may return the edited first part 310-1 to its pre-enlarged state and may display the reduced first part on the display unit 110 as illustrated in FIG. 16. The edited first part 310-1 may be "오전 1시에." Since the first block (905 in FIG. 14) is deleted, no blank is positioned between "오전" and "1시에."

According to an exemplary embodiment of the present invention, text to be edited later is divided into a plurality of pieces that respectively correspond to a plurality of blocks, and the divided pieces of the text are enlarged and displayed on the display unit 110 having a limited size. Accordingly, a user can easily recognize the text that is to be edited later.

Further, since the text edition is performed through selection of the enlarged block by the touch input in the text edition process, accurate selection and control becomes possible in comparison to the case where the text is edited using the cursor movement.

The text that is to be later edited is divided into respective letters, syllables, numerals, and/or symbols in the text edition process, thus allowing for easy and accurate selection and control.

Figure 17:
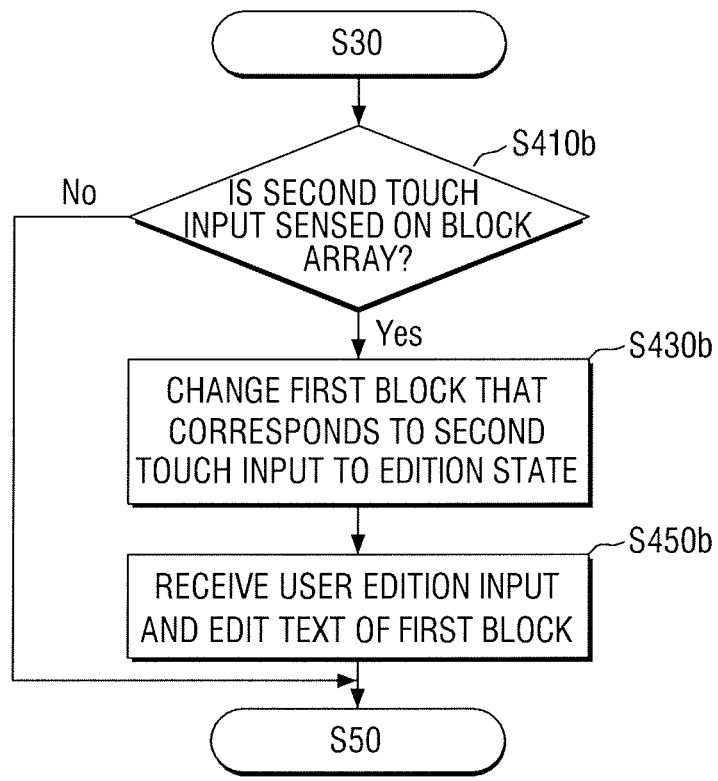
FIG. 17 is a flowchart illustrating a method for editing a first part in a method for editing text according to an exemplary embodiment of the present invention.

FIG. 17 is a flowchart illustrating a method for editing a first part in a method for editing text as illustrated in FIG. 2 according to an exemplary embodiment of the present invention, Referring to FIG. 17, in editing the enlarged first part (S40b), whether a second touch input occurs on the block array may be sensed (S410a), and when the second touch input occurs, one of blocks (e.g., first block) that corresponds to the second touch input and that is included in the block array is activated to an edition state (S430b). A user's edition input may be received, and the text displayed on the first block may be edited (S450b).

FIGS. 18 to 25 are views illustrating processes of editing text using a terminal according to exemplary embodiments of the present invention. For example, FIGS. 18 to 21 illustrate a process of editing English text, and FIGS. 22 to 25 illustrate a process of editing Korean text.

Referring to FIGS. 1, 2, 4, 5, and 17 to 21, a process of editing an English text is described.

As illustrated in FIG. 4, when a user operates an input unit 130 (e.g., a keypad that is displayed on a keypad display area KA of the display unit 110) in a text preparation mode of the terminal, the controller 150 may display text 200 on the text display area TA of the display unit 110 in response to the user's keypad operation.

When the touch sensor 111 senses a user's touch input (hereinafter referred to as a "first touch input") that occurs on the text 200 displayed on the display unit 110 during the preparation of the text 200, the controller 150 may divide a word "Beyond" that corresponds to the first part 210 of the text 200 into letters "B", "e", "y", "o", "n", and "d" in response to the first touch input as illustrated in FIG. 5. The controller 150 may allocate the respective letters to a plurality of blocks 901, 903, 905, 907, 909, and 911, and may enlarge the first part on the display unit 110 in the form of a block array 900.

When an enlargement termination input is caused by the user after the first part 210 is enlarged and displayed, the controller 150 may return the first part 210 to its pre-enlarged state, displaying the reduced first part 210. For example, as shown in FIG. 5, when a user's touch input (hereinafter referred to as a "fourth touch input") occurs on the remaining part of the display unit 110 except for the part on which the block array 900 is displayed, the controller 110 may recognize the fourth touch input as the enlargement termination input and may return the first part 210 to its pre-enlarged state as illustrated in FIG. 4, displaying the reduced first part 210 on the display unit 110. The terminal 10 may return to the text preparation mode for receiving text from the user as described above with reference to FIG. 4.

Figure 18:
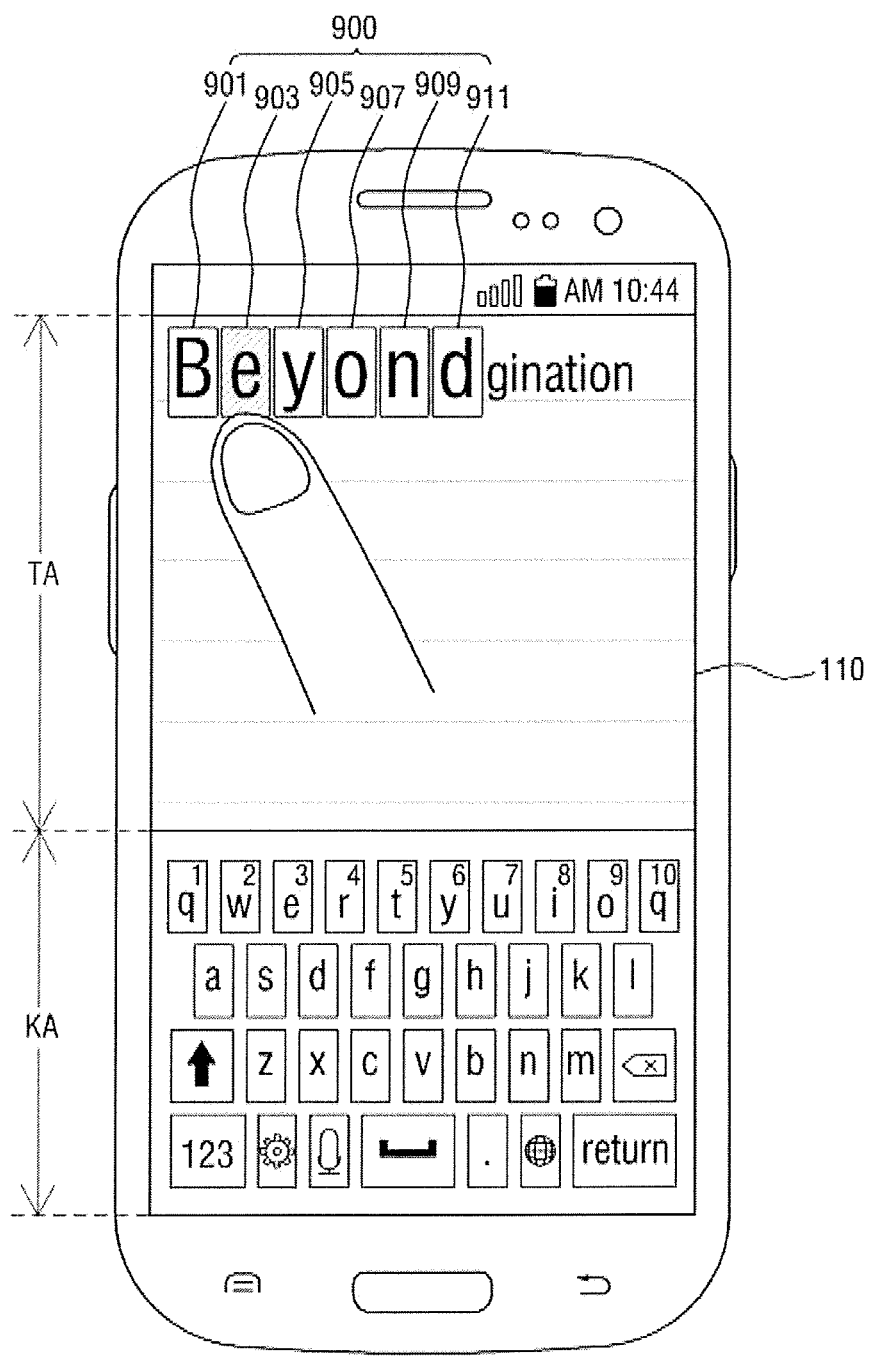
FIGS. 18 to 25 are views illustrating processes of editing text using a terminal according to exemplary embodiments of the present invention.

As illustrated in FIG. 18, when a user's touch input (hereinafter referred to as a "second touch input") for selecting one 903 (hereinafter, referred to as a "first block") of the plurality of blocks 901, 903, 905, 907, 909, and 911 that are included in the block array 900 occurs, the controller 150 may activate the first block corresponding to the second touch input to the edition state. As used herein, the edition state may refer to where the text (e.g., "e") included in the first block 903 can be deleted, copied, cut, or changed to other text.

The first block 903 that is activated to the edition state may be visually distinguished from other blocks 901, 905, 907, 909, and 911. For example, as illustrated in FIG. 18, the controller 150 may highlight the first block 903 that corresponds to the second touch input, and thus the user can more easily recognize the block that is activated to the edition state.

Figure 19:
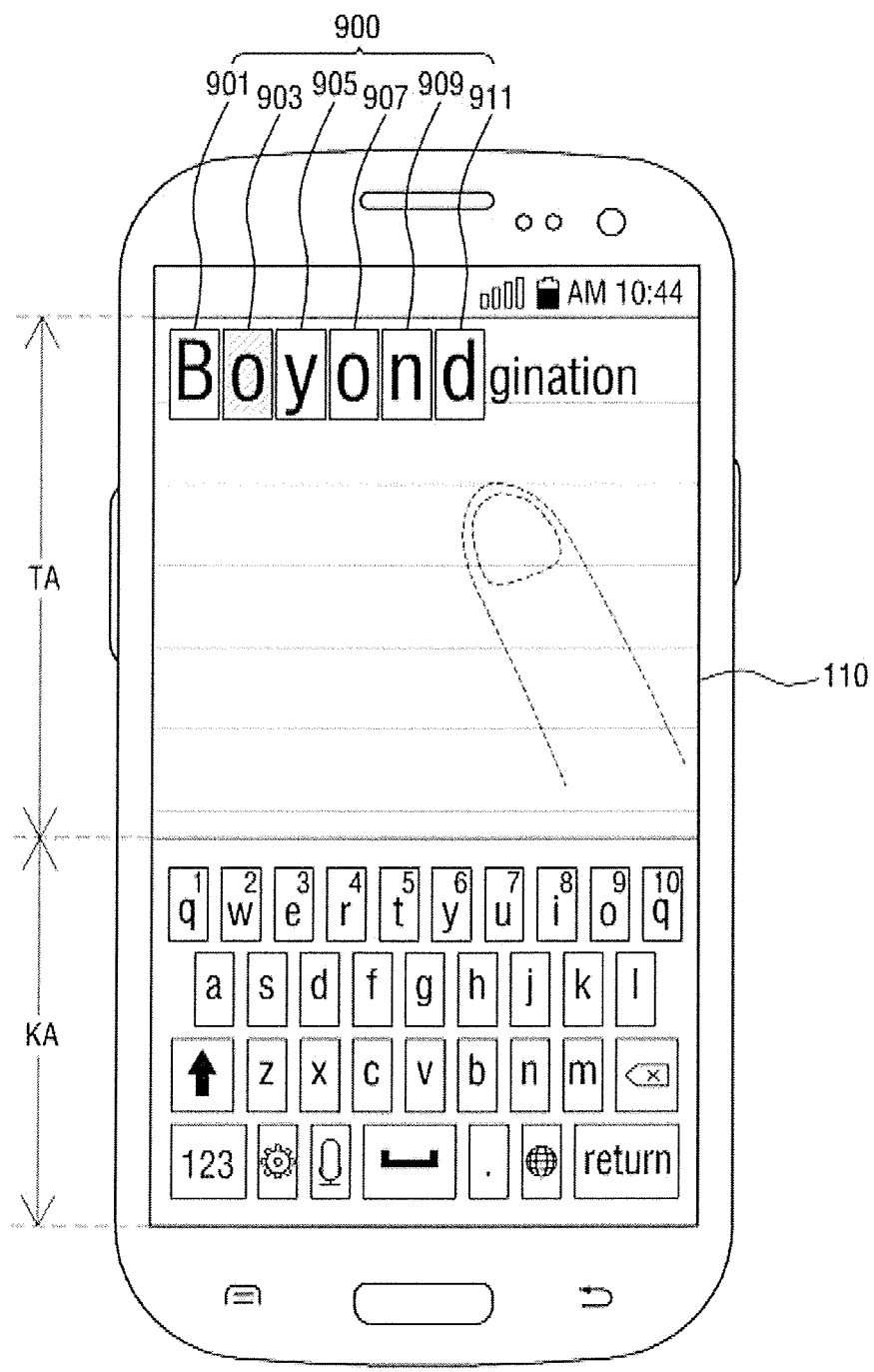
Figure 20:
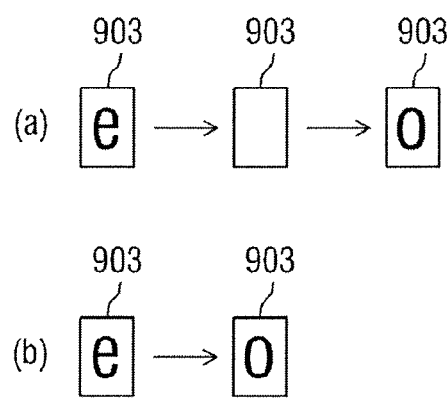

Thereafter, the text (e.g., "e") that is displayed on the first block 903 activated to the edition state may be replaced by other text (e.g., "o") as illustrated in FIG. 19 in response to the user's edition input.

Various methods may be used to edit the text of the first block 903 that is activated to the edition state. For example, as illustrated in FIG. 20A, the text (e.g., "e") of the first block 903 that is activated to the edition state may be deleted when a text deletion input (e.g., backspace input) is caused by the user. Thereafter, when the text input (e.g., input of letter "o") is caused by the user, other text (e.g., letter "o") that corresponds to the text input may be displayed in the first block 903. As illustrated in FIG. 20B, when the text input (e.g., input of letter "o") is caused by the user, even when performing a separate process of deleting the text (e.g., "e") of the first block 903 that is activated to the edition state, the text displayed on the first block 903 can be directly changed to other text (e.g., "o") that corresponds to the text input. For example, when the text input for inputting "o" is caused by the user while the first block 903 is activated to the edition state, the text (e.g., "e") that is previously displayed on the first block 903 may be replaced by the text (e.g., "o") input by the user.

Figure 21:
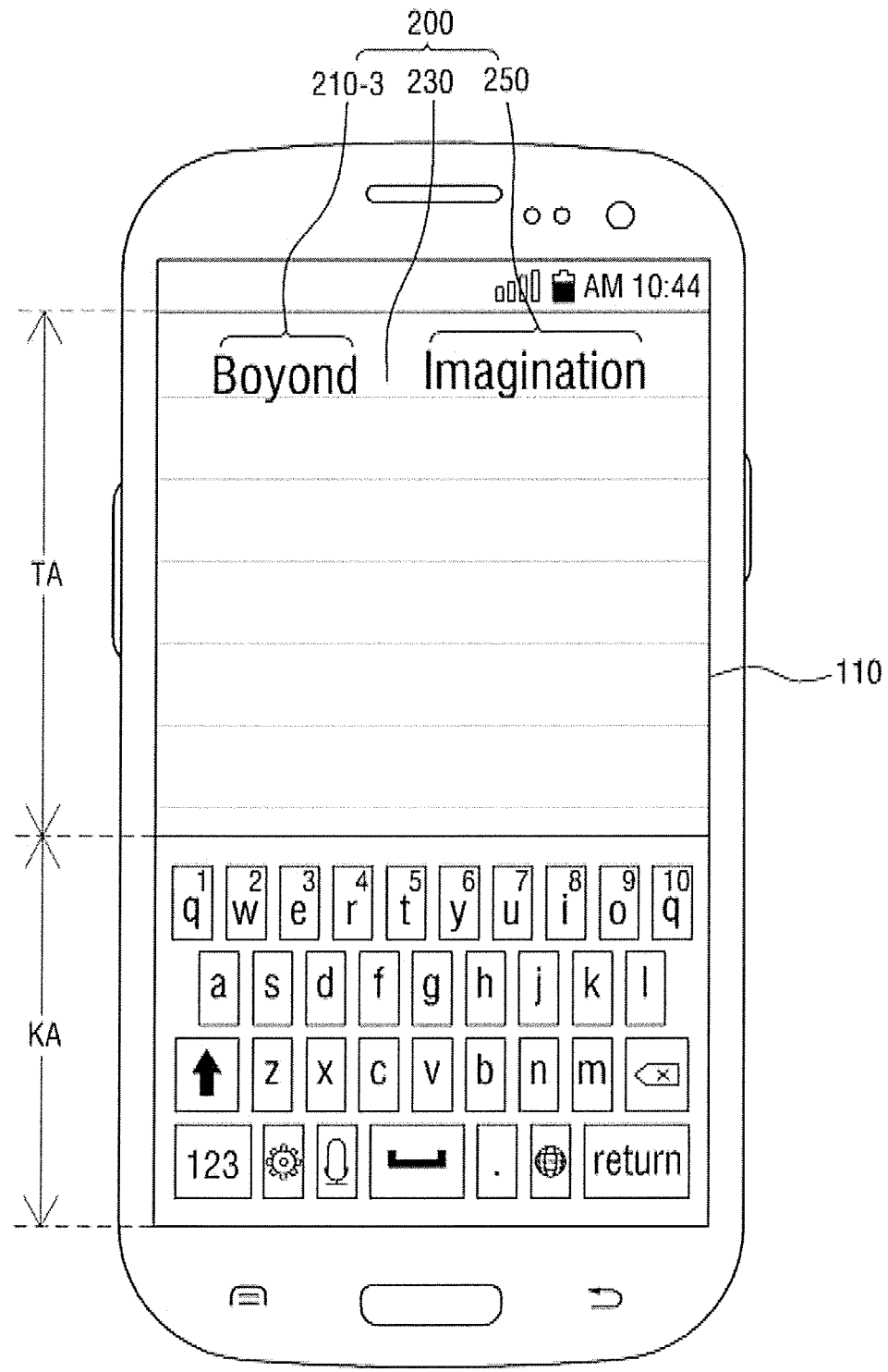

Thereafter, when the enlargement termination input (e.g., the fourth touch input) is input by the user, the controller 150 may return the edited first part 210-3 to the pre-enlarged state as illustrated in FIG. 21 and may display the reduced first part on the display unit 110.

FIGS. 22 to 25 exemplarily illustrate edition screens of Korean text. Referring to FIGS. 1, 2, 11, 12, and 22 to 25, an example of a Korean text edition process will be described.

As illustrated in FIG. 11, when a user operates an input unit 130 (e.g., a keypad that is displayed on a keypad display area KA of the display unit 110), the controller 150 may display text 300 on the text display area TA of the display unit 110 in response to the user's operation of the input unit 130.

When the touch sensor 111 senses the user's touch input (hereinafter referred to as a "first touch input") that occurs on the text 300 displayed on the display unit 110 during the preparation of the text 300, the controller 150 may divide an eojeol "오전11시에" that corresponds to the first part 310 of the text 300 into respective syllables and numerals "오", "전", "1", "1", "시", and "에." As used herein, "eojeol" refers to each part of a sentence which is separated by spaces from its preceding and succeeding ones. The first part of the text 300 may be divided into syllables, numerals, symbols, and letters depending on the type of the text 300. The controller 150 may allocate the respective syllables and numerals to the plurality of blocks 901, 903, 905, 907, 909, and 911, respectively, and may enlarge the first part 310 on the display unit 110 in the form of a block array 900.

When an enlargement termination input (e.g., fourth touch input) is caused by the user after the first part 310 is enlarged and displayed, the controller 150 may return the first part 310 to its pre-enlarged state, displaying the reduced first part 310 as illustrated in FIG. 11.

Figure 22:
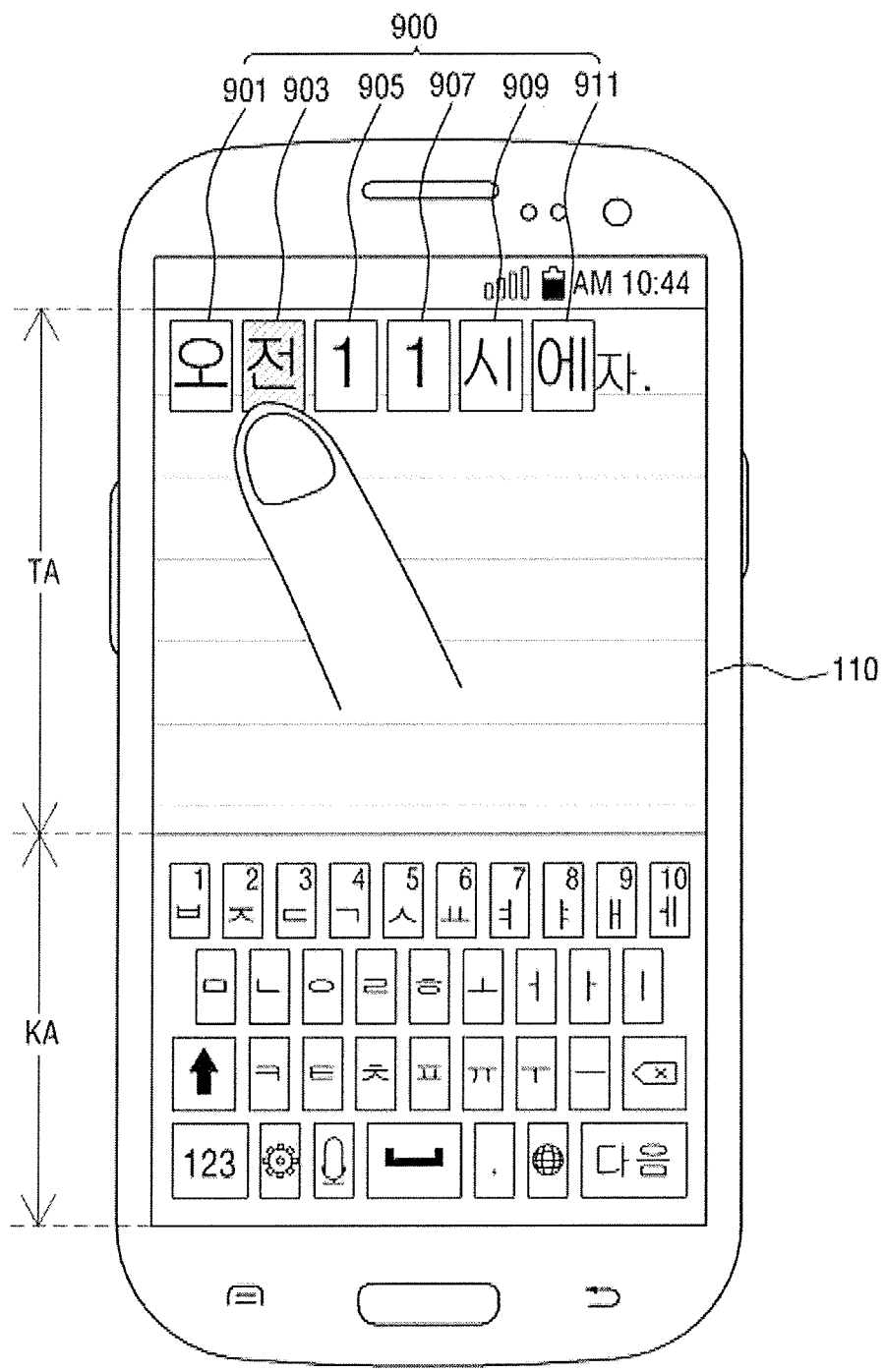

As illustrated in FIG. 22, when a user's touch input (hereinafter referred to as a "second touch input") for selecting one 903 (hereinafter, referred to as a "first block") of the plurality of blocks 901, 903, 905, 907, 909, and 911 that is included in the block array 900 occurs, the controller 150 may activate the first block 903 corresponding to the second touch input to the edition state. The first block 903 that is activated to the edition state may be highlighted, thus visually distinguishing the first block 903 from other blocks 901, 905, 907, 909, and 911. Thus, the user can more easily recognize the block that is activated to the edition state.

Figure 23:
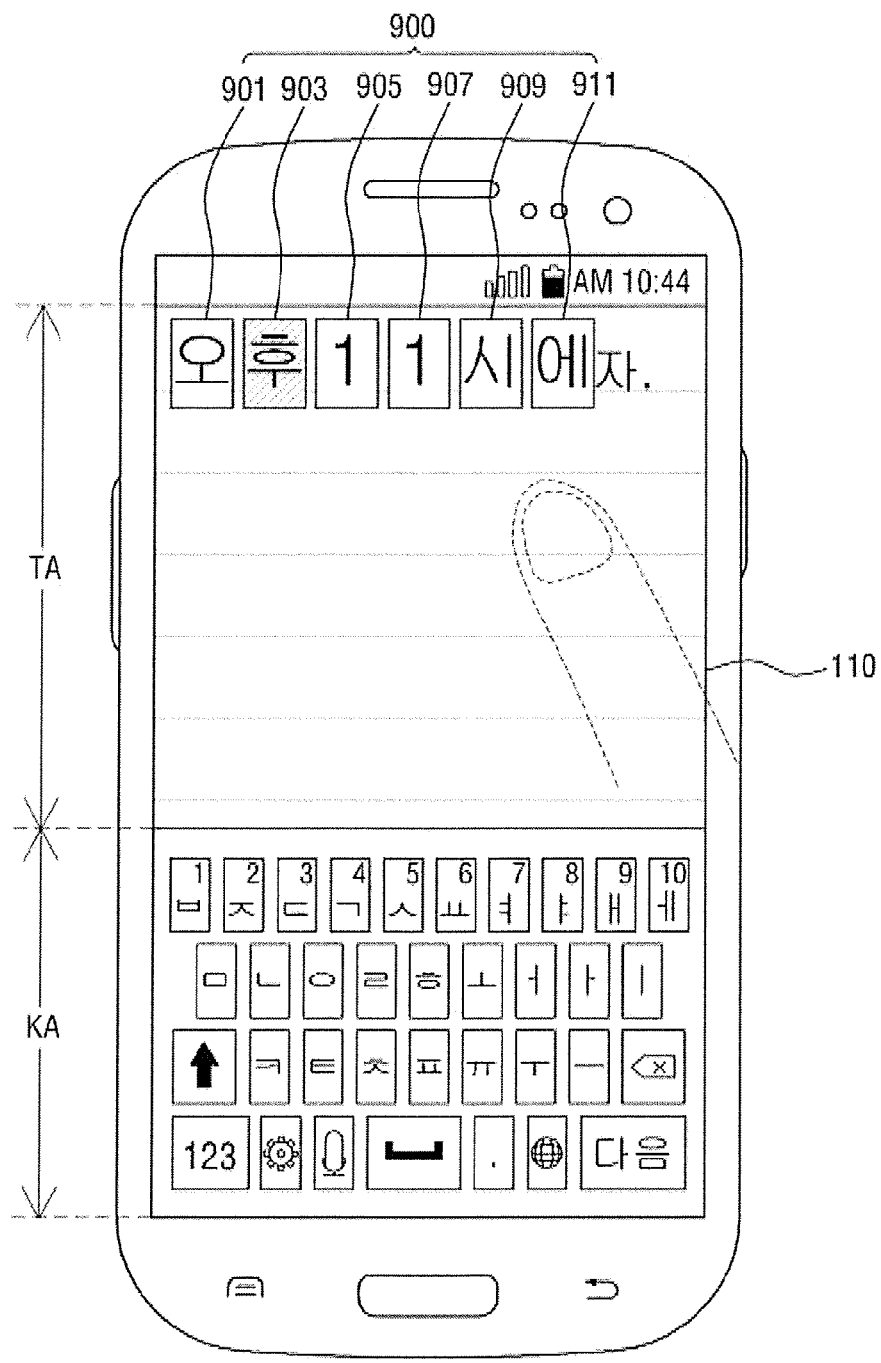
Figure 24:
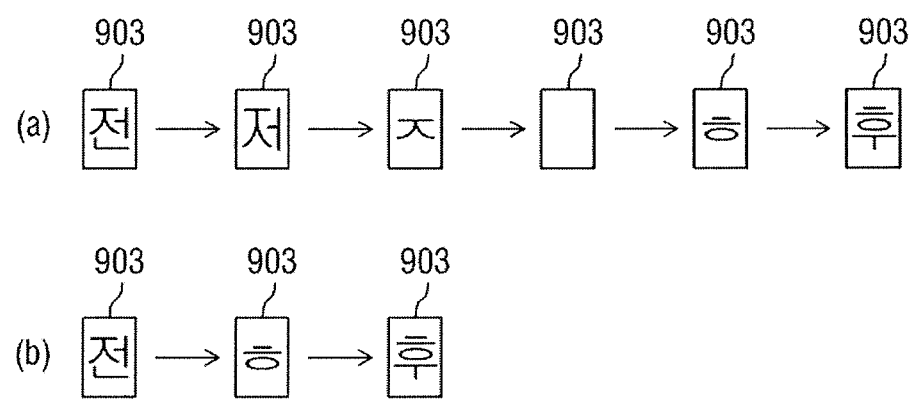

Thereafter, the text (e.g., "전") that is displayed on the first block 903 activated to the edition state may be replaced by other text (e.g., "후") as illustrated in FIG. 23 in response to the user's edition input (e.g., input of "후").

Various methods may be used to edit the text of the first block 903 that is activated to the edition state. For example, as illustrated in FIG. 24A, the text (e.g., "전") of the first block 903 that is activated to the edition state may be deleted when a text deletion input (e.g., a backspace input) is caused by the user. In an exemplary embodiment of the present invention, the text of the first block 903 may be deleted on a per-phoneme basis in response to the user's text deletion input. For example, when a backspace input is caused by the user while the first block 903 that is activated to the edition state displays "전", the first block 903 displays "저". For example, one phoneme (e.g., "ㄴ") is deleted from "전" in response to the user's backspace input. When one more backspace input is caused by the user, the first block 903 displays "ㅈ", which is obtained by deleting one phoneme (e.g., "ㅓ") from "저." When one further backspace input is caused, the phoneme (e.g., "ㅈ") is deleted, and thus the first block 903 displays a blank. For example, the first block 903 becomes a blank block. When the text input of "ㅎ" and "ㅜ" is sequentially caused by the user, the first block 903 sequentially displays "ㅎ" and "후."

Accordingly, the text to be edited can be corrected on a per-phoneme basis, thus enabling the text correction to be performed in various ways.

As illustrated in FIG. 24B, when the text input (e.g., input of "후") is caused by the user, even when not separately deleting the text (e.g., "전") of the first block 903 that is activated to the edition state, the text displayed on the first block 903 can be directly changed to other text (e.g., "후") that corresponds to the text input. For example, when the text inputs "ㅎ" and "ㅜ" are sequentially caused by the user while the first block 903 is activated to the edition state, the text (e.g., "전") that is previously displayed on the first block 903 may be sequentially replaced by "ㅎ" and "후".

Figure 25:
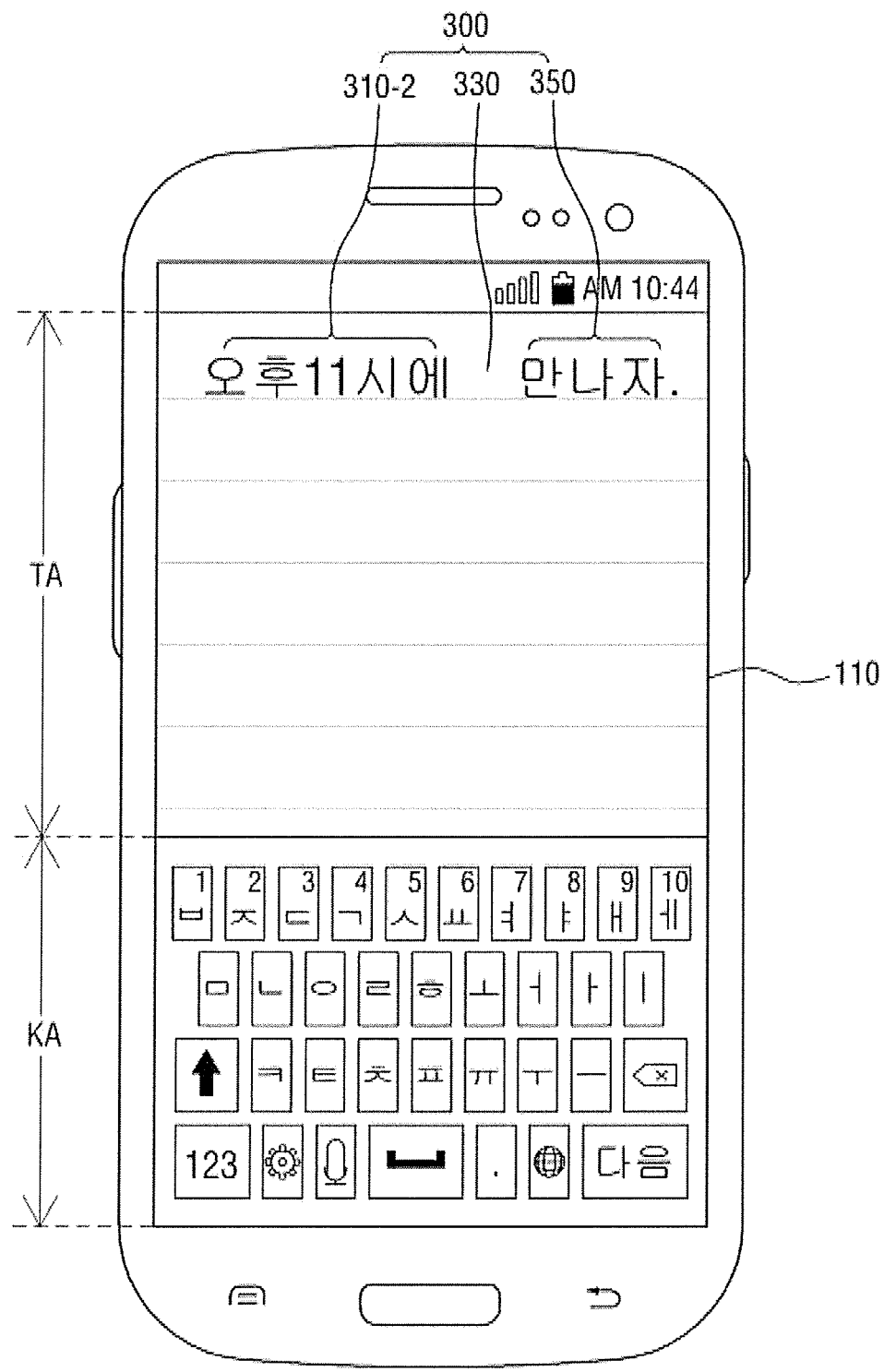

Thereafter, when the enlargement termination input (e.g., the fourth touch input) is input by the user, the controller 150 may return the edited first part 310-2 to the pre-enlarged state as illustrated in FIG. 25 and may display the reduced first part on the display unit 110.

Figure 26:
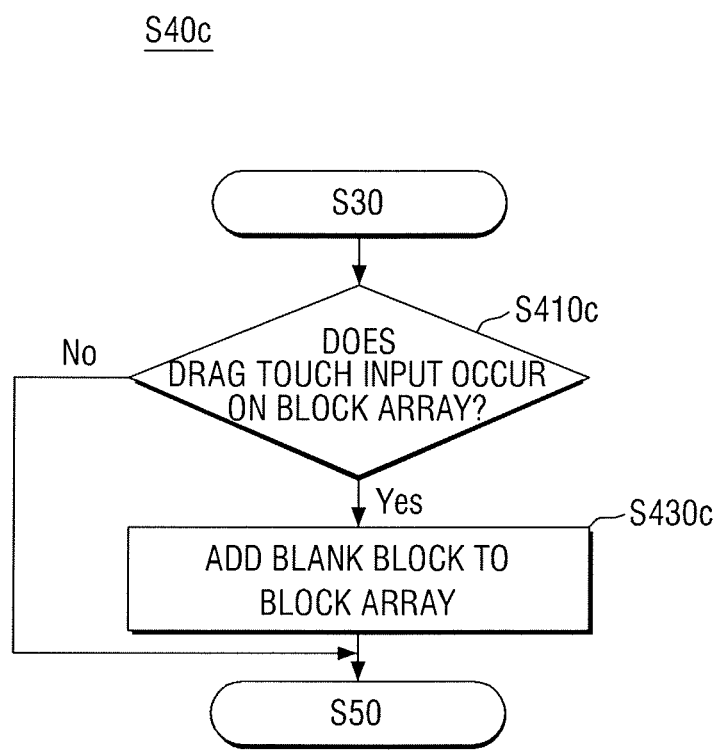
FIG. 26 is a flowchart illustrating a process for editing a first part in a method for editing text according to an exemplary embodiment of the present invention.

FIG. 26 is a flowchart illustrating a method for editing a first part in a method for editing text according to an exemplary embodiment of the present invention.

Referring to FIG. 26, in editing the enlarged first part (S40c), a drag touch input that occurs on the block array is sensed (S410c), and when the drag touch input is sensed, a blank block is added to the block array corresponding to the drag touch input (S430c). As used herein, the blank block means a block where a separate text is not displayed.

Figure 27:
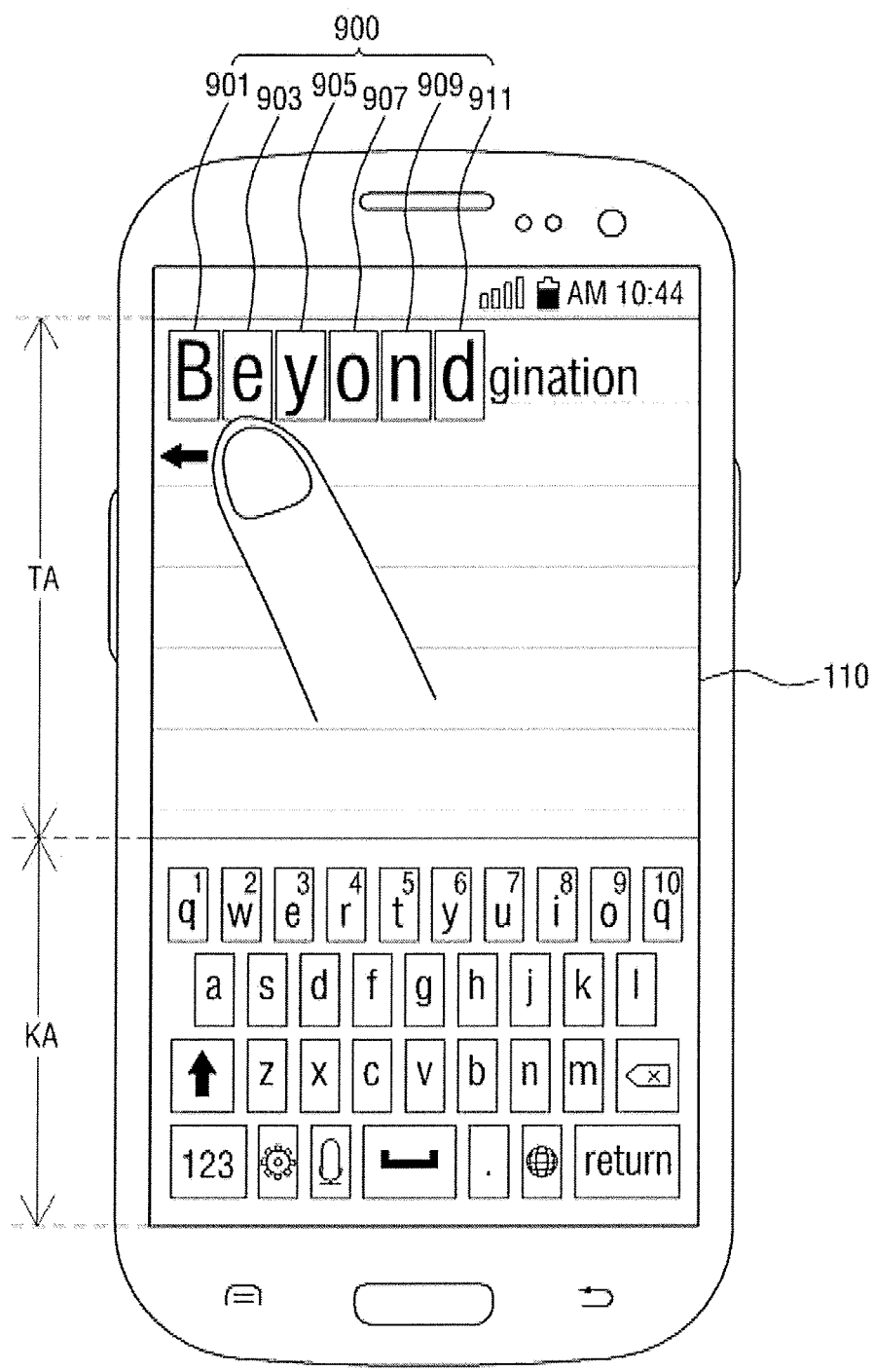
FIGS. 27 to 30 are views illustrating processes of editing text using a terminal according to exemplary embodiments of the present invention.
Figure 28:
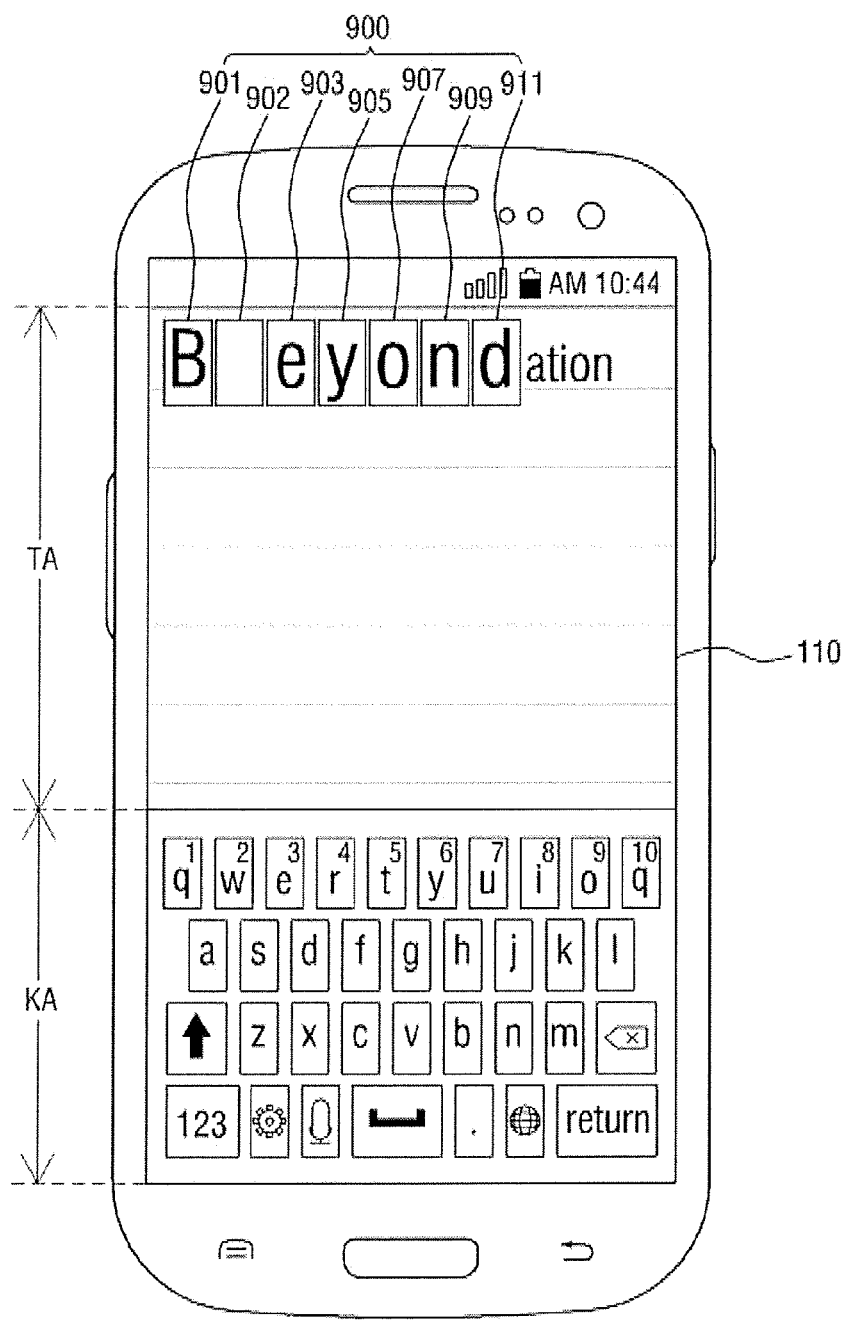
Figure 29:
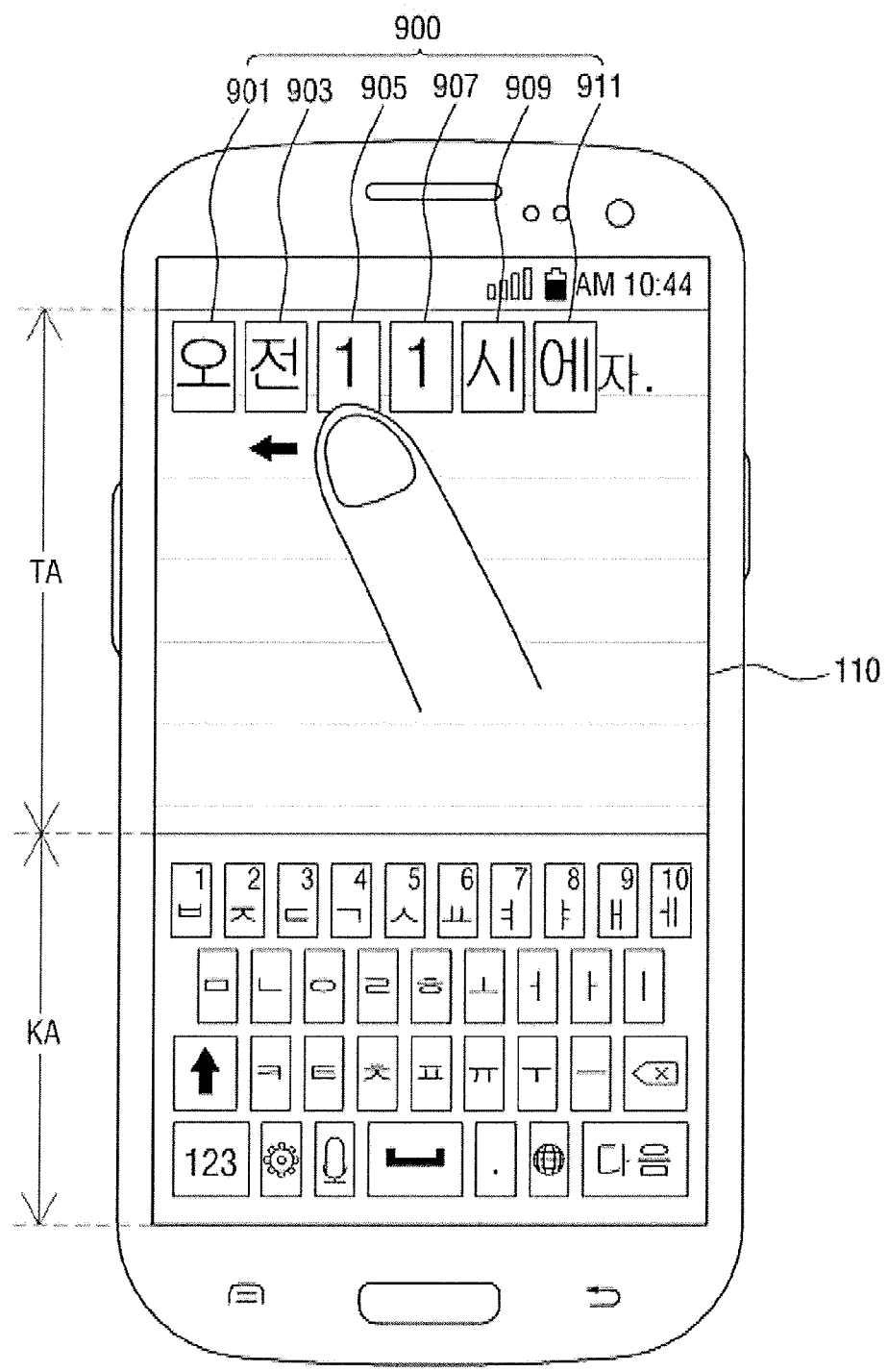
Figure 30:
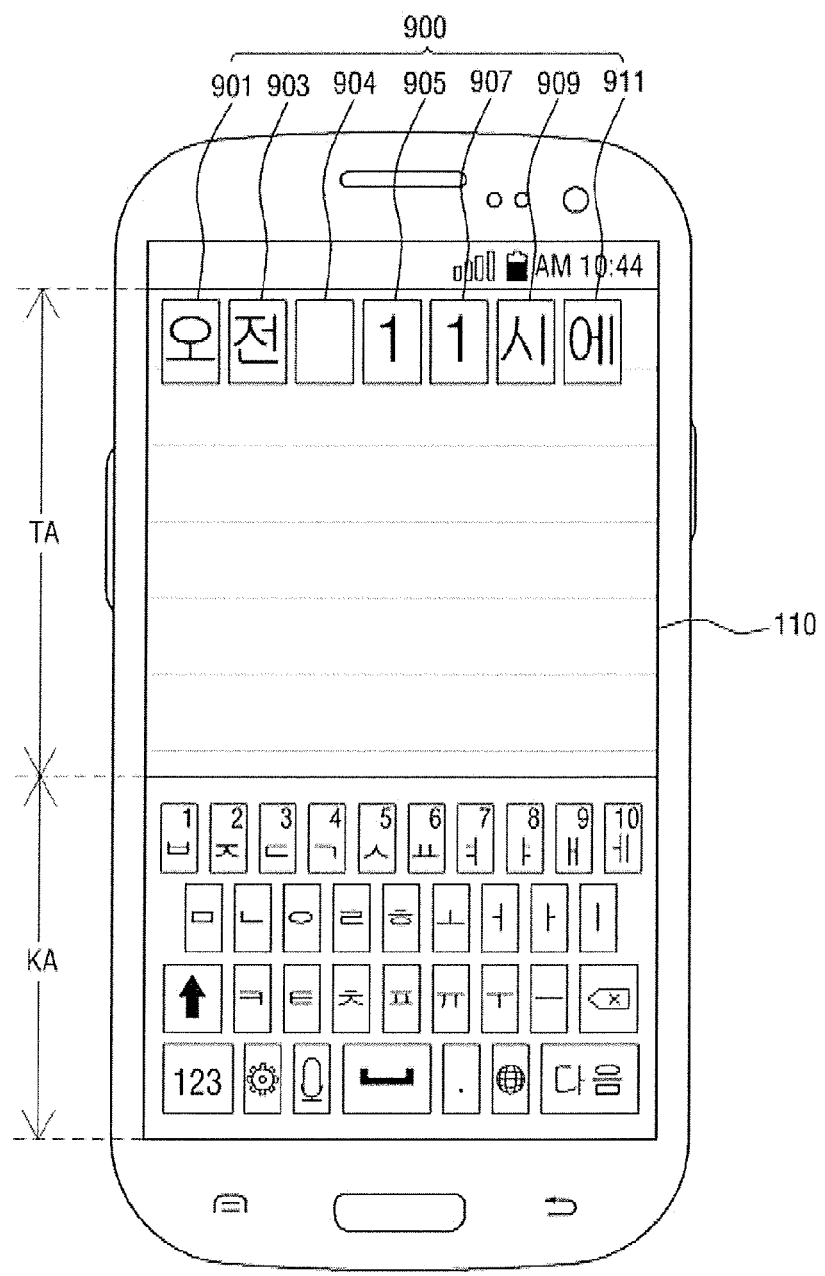

FIGS. 27 to 30 are views illustrating processes of editing text using a terminal according to exemplary embodiments of the present invention. FIGS. 27 and 28 illustrate a process of editing English text, and FIGS. 29 and 30 illustrate a process of editing Korean text.

Referring to FIGS. 1, 2, 4, 5, 27, and 28, a process of editing an English text edition process is described.

As illustrated in FIG. 4, in response to a user's keypad operation that occurs in the keypad display area KA of the display unit 110 in a text preparation mode of the terminal, the controller 150 may display the text 200 that corresponds to the keypad operation on the text display area TA of the display unit 110.

When the touch sensor 111 senses the user's touch input (e.g., the "first touch input") that occurs on the text 200 displayed on the display unit 110 during the preparation of the text 200, the controller 150 may divide the word "Beyond" that corresponds to the first part 210 of the text 200 into letters "B", "e", "y", "o", "n", and "d" in response to the first touch input as illustrated in FIG. 5. The controller 150 may allocate the respective letters to a plurality of blocks 901, 903, 905, 907, 909, and 911, and may enlarge the first part on the display unit 110 in the form of a block array 900. When the enlargement termination input is caused by the user after the first part 210 is enlarged and displayed, the controller 150 may return the first part 210 to its pre-enlarged state, displaying the reduced first part 210.

When a drag touch input is caused by the user on the plurality of blocks 901, 903, 905, 907, 909, and 911 of the block array 900 as illustrated in FIG. 27, the controller 150 may add a blank block 902 to the block array 900 as illustrated in FIG. 28 in response to the drag touch input.

For example, when the drag touch input occurs on the block array 900, the controller 150 may add the blank block 902 to a position that is closest to the block (e.g., first block) that corresponds to a start point of the drag touch input. The position to which the blank block 902 is added may correspond to the direction of the drag touch input. For example, when the drag touch input is caused in the left direction as illustrated in FIG. 27, the blank block 902 may be inserted at the left side of the first block 903. In substantially the same manner, when a drag touch input is caused in the right direction, a blank block may be inserted at the right side of the first block 903.

When the user selects the blank block 902, an additional text may be inserted into the blank block 902. When the user makes an enlargement termination input (e.g., fourth touch input) without adding separate text, the first part can be returned to its pre-enlarged state, and a reduced first part can be displayed. When the enlargement termination input occurs without adding the separate text, a blank is displayed where the blank block 902 is inserted. For example, a space is displayed on the display unit 110, thus resulting in the text being "B eyond Imagination." For example, a blank may be positioned between the text "B" and the text "eyond".

FIGS. 29 and 30 illustrate a process of editing a Korean text according to an exemplary embodiment of the present invention. Referring to FIGS. 1, 2, 11, 12, 16, 29, and 30, a process of editing a Korean text is described.

As illustrated in FIG. 11, when a user operates the keypad that is displayed on the keypad display area KA of the display unit 110, the controller 150 may display the text 300 on the text display area TA of the display unit 110 in response to the user's keypad operation.

When the touch sensor 111 senses the user's touch input (hereinafter referred to as a "first touch input") that occurs on the text 300 displayed on the display unit 110 during the preparation of the text 300, the controller 150 may divide an eojeol "오전11시에" that corresponds to the first part 310 of the text 300 into respective syllables and numerals "오", "전", "1", "1", "시", and "에" in response to the first touch input. The controller 150 may allocate the respective syllables and numerals to the plurality of blocks 901, 903, 905, 907, 909, and 911, respectively, and the controller 150 may enlarge the first part 310 on the display unit 110 in the form of a block array 900.

When the enlargement termination input (e.g., fourth touch input) is caused by the user after the first part 310 is enlarged and displayed, the controller 150 may return the first part 310 to its pre-enlarged state, displaying the reduced first part 310 on the display unit 110 as illustrated in FIG. 11.

When a drag touch input occurs on the plurality of blocks 901, 903, 905, 907, 909, and 911 of the block array 900 by the user as illustrated in FIG. 29 without making the enlargement termination input, the controller 150 may add a blank block 902 to the block array 900 as illustrated in FIG. 28 in response to the drag touch input.

For example, when the drag touch input occurs on the block array 900, the controller 150 may add the blank block 902 to a position that is closest to the block 903 (e.g., the first block) that corresponds to the start point of the drag touch input. The position to which the blank block 902 is added may correspond to the direction of the drag touch input as described above with reference to FIGS. 27 and 28.

When the user selects the blank block 902 after the blank block 902 is added, an additional text may be inserted into the blank block 902. When the user makes the enlargement termination input (e.g., fourth touch input) without adding separate text, the first part can be returned to its pre-enlarged state, and a reduced first part can be displayed. In this case, a space may be displayed where the blank block 902 is inserted on the display unit 110, thus resulting in the text being "오전11시에 만나자".

The terminal and the method for editing text using the terminal as described above are not be limited to the exemplary embodiments as described above. For example, all or some of the exemplary embodiments may be selectively combined. For example, adding the blank block through the drag touch input may be combined with editing the text displayed in the block.

Although exemplary embodiments of the present invention have been described, those skilled in the art will appreciate that various modifications, additions and substitutions are possible, without departing from the scope and spirit of the invention as disclosed in the accompanying claims.

What is claimed is:

1. A terminal, comprising:
   a display unit including a touch sensor configured to sense a touch input, the display unit configured to display text; and
   a controller configured to divide a first part of the text into a plurality of sub-parts, to enlarge the first part, and to display the enlarged first part on the display unit in response to a first touch input that is sensed on the text through the touch sensor,
   wherein the first part of the text corresponds to the first touch input,
   wherein the controller is configured to display the divided and enlarged first part on the display unit in the form of a block array that includes a plurality of blocks, allocate the sub-parts of the first part to the plurality of blocks, respectively,
   wherein in response to a second touch input that occurs on the block array and that is sensed through the touch sensor, the controller is configured to delete the text in a first block that corresponds to the second touch input and display the block array, including a blank first block, on the display unit,
   wherein, when a new text input is received after the second touch input occurs, the controller is configured to insert the new text input into the blank first block, and
   wherein, when the new text input is not received after the second touch input occurs, in response to a third touch input that occurs on the blank first block and that is sensed through the touch sensor after the text in the first block is deleted, the controller is configured to delete the blank first block.

2. The terminal of claim 1, wherein the plurality of sub-parts of the first part include syllables, numerals, symbols, and/or letters depending on the type of the text.

3. The terminal of claim 1, further comprising an input unit configured to receive a user's input,
   wherein the controller is configured to turn a first block that corresponds to the second touch input into an edition state, and
   wherein in response to the user's text edition input that is received through the input unit, the controller is configured to edit the text in the first block and display the edited text.

4. The terminal of claim 1, wherein in response to a drag touch input that occurs on the block array and that is sensed through the touch sensor, the controller is configured to add a blank block to the block array and display the block array.

5. The terminal of claim 4, wherein the added blank block is positioned closest to a block that corresponds to a start point of the drag touch input.

6. The terminal of claim 1, wherein in response to a touch input that occurs on a part of the display area except for where the block array is displayed, the controller is configured to return the first part to its pre-enlarged state and is configured to display the first part on the display unit.

7. A method for editing text using a terminal, the method comprising:
   sensing a first touch input that occurs on the text, the text displayed on a text display area of the terminal; and
   dividing a first part of the text into a plurality of sub-parts, enlarging the first part, and displaying the divided and enlarged first part in response to the first touch input,
   wherein the first part of the text corresponds to the first touch input, the enlarged and divided first part is displayed on a block array that includes a plurality of blocks, the sub-parts of the first part are displayed on the plurality of blocks, respectively,
   sensing a second touch input that occurs on the block array after the performing the enlarged display;
   deleting the text in a first block that corresponds to the second touch input;

displaying the block array, including a blank first block, in response to the second touch input;

inserting a new text input into the blank first block, when the new text input is received after the second touch input occurs;

sensing, when the new text input is not received after the second touch input occurs, a third touch input that occurs on the blank first block after deleting the text in the blank first block; and deleting the blank first block in response to the third touch input.

8. The method of claim 7, wherein the sub-parts include syllables, numerals, symbols, and/or letters depending on the type of the text.

9. The method of claim 7, further comprising:

turning a first block that corresponds to the second touch input into an edition state; and editing and displaying the text in the first block in response to a user's edition input.

10. The method of claim 7, further comprising:

sensing a drag touch input that occurs on the block array; and adding a blank block to the block array and displaying the block array in response to the drag touch input.

11. The method of claim 10, wherein the added blank block is positioned closest to a block that corresponds to a start point of the drag touch input.

12. The method of claim 7, further comprising:

sensing a touch input that occurs on a part of the display area except for where the block array is displayed; and returning the first part to its pre-enlarged state and displaying the first part in response to the fourth touch input.

* * * * *